(12) United States Patent
Matsuo et al.

(10) Patent No.: US 10,568,089 B2
(45) Date of Patent: Feb. 18, 2020

(54) WIRELESS COMMUNICATION DEVICE AND WIRELESS COMMUNICATION METHOD

(71) Applicant: KABUSHIKI KAISHA TOSHIBA, Minato-ku (JP)

(72) Inventors: Ryoko Matsuo, Shinagawa (JP); Tomoko Adachi, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 119 days.

(21) Appl. No.: 15/265,109

(22) Filed: Sep. 14, 2016

(65) Prior Publication Data

US 2017/0006606 A1 Jan. 5, 2017

Related U.S. Application Data

(63) Continuation of application No. PCT/JP2015/062158, filed on Apr. 21, 2015.

(30) Foreign Application Priority Data

Apr. 21, 2014 (JP) .................................. 2014-087710

(51) Int. Cl.
*H04W 72/04* (2009.01)
*H04W 84/12* (2009.01)

(52) U.S. Cl.
CPC ........ *H04W 72/0446* (2013.01); *H04W 84/12* (2013.01)

(58) Field of Classification Search
CPC . H04W 72/0446; H04W 84/12; H04W 28/18; H04W 72/042; H04W 72/0453; H04L 5/0053

(Continued)

(56) References Cited

U.S. PATENT DOCUMENTS 5,966,378 A 10/1999 Hamalainen
8,064,371 B2 11/2011 Toshimitsu et al.
(Continued)

FOREIGN PATENT DOCUMENTS

JP 11-513865 A 11/1999
JP 2003-348641 12/2003
(Continued)

OTHER PUBLICATIONS

Park 11: Wireless LAN Medium Access Control (MAC) and Physical Layer (PHY) Specifications, IEEE Computer Society, IEEE Std. 802.11™—2012, Mar. 29, 2012, 2793 pages.

(Continued)

*Primary Examiner* — Mohammad S Adhami
(74) *Attorney, Agent, or Firm* — Oblon, McClelland, Maier & Neustadt, L.L.P.

(57) ABSTRACT

According to one embodiment, a wireless communication device includes a receiver configured to receive from each of a plurality of other wireless communication devices first information specifying at least one communication resource requested to be allocated; and a transmitter configured to transmit second information specifying at least one communication resource allocated to each of the other wireless communication devices based on the first information. The transmitter is configured to transmit signals via the communication resources specified in the second information and the receiver is configured to receive signals via the communication resources specified in the second information.

7 Claims, 19 Drawing Sheets

| Element ID | Length | Minimum Channel Number | Channel Band Inf. |

(A)

| Element ID | Length | Channel Number (Lower) | Channel Number (Upper) |

(B)

(58) Field of Classification Search
USPC .......................................................... 370/329
See application file for complete search history.

(56) References Cited

U.S. PATENT DOCUMENTS

| | | | |
|---|---|---|---|
| 8,259,745 B2 | 9/2012 | Gong et al. | |
| 8,675,574 B2 | 3/2014 | Tanigawa et al. | |
| 8,699,427 B2 | 4/2014 | Tanigawa et al. | |
| 8,699,442 B2 | 4/2014 | Noh et al. | |
| 9,031,054 B2 | 5/2015 | Marin et al. | |
| 9,107,242 B2 | 8/2015 | Sohn et al. | |
| 9,119,110 B2 | 8/2015 | Merlin et al. | |
| 9,137,826 B2 | 9/2015 | Merlin et al. | |
| 9,565,567 B2 | 2/2017 | Chaves et al. | |
| 9,648,613 B2 | 5/2017 | Choi et al. | |
| 9,756,612 B2 | 9/2017 | Park et al. | |
| 9,820,304 B2 | 11/2017 | Gong et al. | |
| 2005/0135318 A1 | 6/2005 | Walton et al. | |
| 2006/0050742 A1 | 3/2006 | Grandhi et al. | |
| 2009/0323608 A1 | 12/2009 | Adachi et al. | |
| 2010/0020754 A1 | 1/2010 | Tanigawa et al. | |
| 2010/0177756 A1* | 7/2010 | Choi | H04W 72/042 370/338 |
| 2010/0220679 A1 | 9/2010 | Abraham et al. | |
| 2011/0044302 A1 | 2/2011 | Toshimitsu et al. | |
| 2011/0235576 A1 | 9/2011 | Gong et al. | |
| 2011/0268046 A1* | 11/2011 | Choi | H04L 5/0007 370/329 |
| 2011/0282989 A1 | 11/2011 | Geirhofer et al. | |
| 2012/0002631 A1 | 1/2012 | Nishio et al. | |
| 2012/0044900 A1 | 2/2012 | Morioka et al. | |
| 2012/0099530 A1 | 4/2012 | Morioka et al. | |
| 2012/0120892 A1 | 5/2012 | Freda et al. | |
| 2012/0218983 A1 | 8/2012 | Noh et al. | |
| 2012/0300707 A1 | 11/2012 | Gong et al. | |
| 2013/0051256 A1 | 2/2013 | Ong et al. | |
| 2013/0107855 A1* | 5/2013 | Takeda | H04L 5/001 370/330 |
| 2013/0163576 A1 | 6/2013 | Wang et al. | |
| 2013/0223427 A1 | 8/2013 | Sohn et al. | |
| 2013/0295989 A1* | 11/2013 | Smadi | H04W 16/14 455/553.1 |
| 2014/0112266 A1 | 4/2014 | Seok | |
| 2014/0204891 A1 | 7/2014 | Park | |
| 2015/0071211 A1 | 3/2015 | Seok | |
| 2015/0230244 A1 | 8/2015 | Choi et al. | |
| 2015/0373685 A1 | 12/2015 | Seok | |
| 2017/0006581 A1 | 1/2017 | Matsuo et al. | |
| 2017/0006596 A1 | 1/2017 | Adachi et al. | |
| 2017/0006606 A1 | 1/2017 | Matsuo et al. | |
| 2017/0006609 A1 | 1/2017 | Adachi et al. | |
| 2017/0027006 A1* | 1/2017 | Vikberg | H04W 36/14 |
| 2018/0084566 A1 | 3/2018 | Wang et al. | |

FOREIGN PATENT DOCUMENTS

| | | |
|---|---|---|
| JP | 2004-23143 | 1/2004 |
| JP | 2008-79156 A | 4/2008 |
| JP | 2009-171506 | 7/2009 |
| JP | 2011-211709 A | 10/2011 |
| JP | 2011-229089 A | 11/2011 |
| JP | 2012-120180 | 6/2012 |
| JP | 2013-511238 A | 3/2013 |
| JP | 2013-541293 | 11/2013 |
| JP | 2014-502091 A | 1/2014 |
| JP | 2014-42360 A | 3/2014 |
| JP | 2014-87714 A | 5/2014 |
| JP | 2014-87718 A | 5/2014 |
| WO | WO 97/15994 | 5/1997 |
| WO | WO 2009/138820 A1 | 11/2009 |
| WO | WO 2011/126819 A2 | 10/2011 |
| WO | WO 2012/002705 A2 | 1/2012 |
| WO | WO 2012/093794 A2 | 7/2012 |
| WO | WO 2015/163335 A1 | 10/2015 |
| WO | WO 2015/163336 A1 | 10/2015 |

OTHER PUBLICATIONS

Park 11: Wireless LAN Medium Access Control (MAC) and Physical Layer (PHY) Specifications; Amendment 4: Enhancements for Very High Throughput for Operation in Bands below 6 GHz, IEEE Computer Society, IEEE Std. 802.11ac™—2013, Approved Dec. 11, 2013, 425 pages.
Wireless LANs, Specification Framework for TGax, IEEE 802.11-15/0132r4, Mar. 2015, 5 pages.
International Search Report dated Jul. 7, 2015 in International Application No. PCT/JP2015/062158.
International Preliminary Report on Patentability and Written Opinion dated Nov. 3, 2016 in International Application No. PCT/JP2015/062158.
Robert Stacey, "11-15-0132-17-00ax-spec-framework" Specification Framework for TGax, May 25, 2016, pp. 1-61.

* cited by examiner

WIRELESS COMMUNICATION DEVICE AND WIRELESS COMMUNICATION METHOD

CROSS REFERENCE TO RELATED APPLICATIONS

This application is a Continuation of International Application No. PCT/JP2015/062158, filed on Apr. 21, 2015, the entire contents of which is hereby incorporated by reference.

FIELD

Embodiments of the present invention relate to a wireless communication device and a wireless communication method.

BACKGROUND

In recent years, there has been increasing demand for high-speed communication in a wireless communication. As a method for meeting such a demand, there has been a method of increasing a frequency bandwidth in a wireless channel used for the wireless communication. On the other hand, a wireless frequency band is a valuable resource used in various applications and has been demanded to be efficiently utilized. In consideration of such a circumstance, it is desired to improve a utilization efficiency of the frequency band that is the valuable resource as well as to attain coexistence with existing wireless technologies. As a method for increasing the frequency bandwidth in the wireless channel while improving the utilization efficiency of the frequency band in this way, a technology is effective which performs a broadband wireless communication by simultaneously using a plurality of wireless channels.

For example, with respect to a wireless channel having 20 MHz width given as a primary channel, a channel to use is extended from the primary channel by adding a channel selected preferentially from an adjacent channel such that the wireless channels are simultaneously used. This achieves a high speed wireless communication with a 160 MHz width at most. In order to simultaneously use the plurality of wireless channels, information on an available channel is shared in advance on transmission and reception sides by way of exchanging a control frame to decide a bandwidth used for transmitting and receiving data.

In the scheme described above for using simultaneously using the plurality of wireless channels, there is one common channel (primary channel) as a system, and channels are sequentially selected from an adjacent channel and added to the common channel. For this reason, the common channel and the adjacent channel close to the common channel are used highly frequently, resulting in high utilization efficiency, but a channel far from the common channel, in spite of being available, is used low frequently, disadvantageously causing low utilization efficiency.

In this way, in the related scheme for simultaneously using the plurality of channels, there has been a problem that the channel lowered in the utilization efficiency exists in view of the whole channels, which lowers the whole channels utilization efficiency.

DETAILED DESCRIPTION

According to one embodiment, a wireless communication device includes a receiver configured to receive from each of a plurality of other wireless communication devices first information specifying at least one communication resource requested to be allocated; and a transmitter configured to transmit second information specifying at least one communication resource allocated to each of the other wireless communication devices based on the first information. The transmitter is configured to transmit signals via the communication resources specified in the second information and the receiver is configured to receive signals via the communication resources specified in the second information.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

(First Embodiment)

Figure 1:
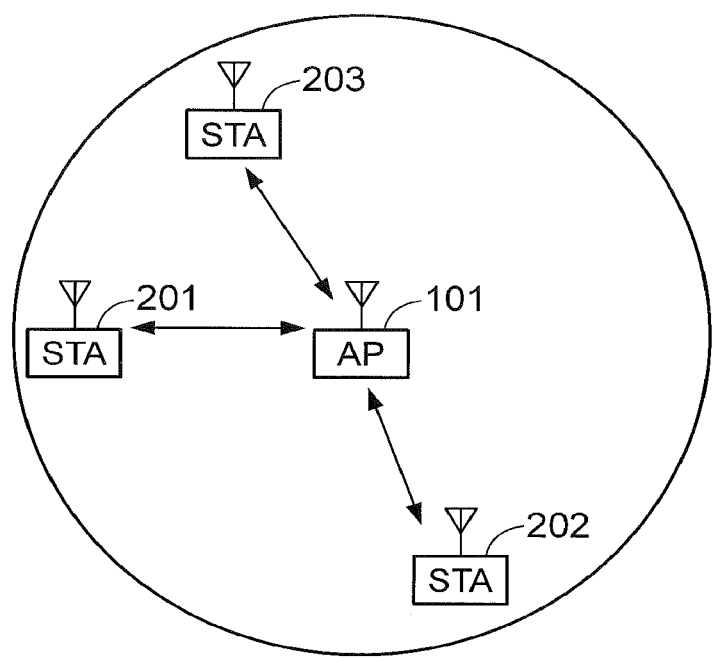
FIG. 1 is a configuration diagram of a wireless communication system including a base station and a terminal according to a first embodiment.

FIG. 1 is a configuration diagram of a wireless communication system including a wireless communication base station and a wireless communication terminal according to a first embodiment. This wireless communication system communicates in accordance with any communication scheme. Here, the IEEE802.11 standard is assumed as the communication scheme without limitation. Hereinafter, the wireless communication base station is referred to as the base station and the wireless communication terminal is referred to as the terminal. The base station is also one form of the terminal but is different from the non-base station terminal in having a relay function.

A base station (AP: Access Point) 101 makes connection with terminals (STA: STAtion) 201, 202, and 203 to form one wireless communication system or wireless communication group. The connection means a state where a wireless link is established, and a parameter required for the communication is completely exchanged by way of an association process with the base station so as to establish the wireless link.

The base station 101 can use a plurality of wireless channels (hereinafter, referred to as channels) within a predetermined frequency band to allocate one or more channels to the terminals so as to simultaneously transmit and receive to and from the plurality of terminals. Such a communication scheme may be called a channel-based OFDMA (Orthogonal Frequency Division Multiple Access) or MU-MC (Multi User-Multi Channel). The simultaneous transmission or reception referred here is one example, and in a case where the base station 101 is capable of a full duplex communication, the transmission and reception can be made at timing independents for each terminal, as described later.

In the embodiment, assume that there are eight channels, from a channel 1 to a channel 8 in an ascending order of their frequencies, as the plurality of channels within a predetermined frequency band. The numerals "1 to 8" of the channels 1 to 8 are channel numbers. Note that in the figure, the base station and the terminals each are illustrated as if to be provided with one antenna, which is a merely schematically illustration, and they may be provided in practice with one or more antennas.

The base station and the terminals each have mounted thereon a wireless communication device for communicating with each other. The wireless communication device mounted on the terminal is a communication device with which the wireless communication device mounted on the base station communicates. The wireless communication device mounted on the base station is a communication device with which the wireless communication device mounted on the terminal communicates.

Here, there may be used a scheme for allocating to the plurality of terminals not in units of channels but in units of subcarriers. More specifically, an OFDMA communication may be used in which, within the continuous frequency domain (e.g., within a 20 MHz channel width, 40 MHz channel width, 80 MHz channel width, 160 MHz channel width), a resource block with a plurality of subcarriers as one unit (which may be referred to as a subchannel) is allocated to each terminal such that the transmission to the plurality of terminals or the reception from the plurality of terminals is simultaneously performed. Here, the resource block is a frequency resource constituted by one or more subcarriers as one unit, and, if constituted by the plurality of subcarriers, arrangements of the respective subcarriers may be or not be consecutive. An expression "resource block" is used in the embodiment, but another expression may be used. For example, it may be called not the resource block, but the subchannel or the frequency block. Moreover, a plurality of non-consecutively arranged subcarriers may be allocated as the resource block to one wireless terminal.

Figure 20:
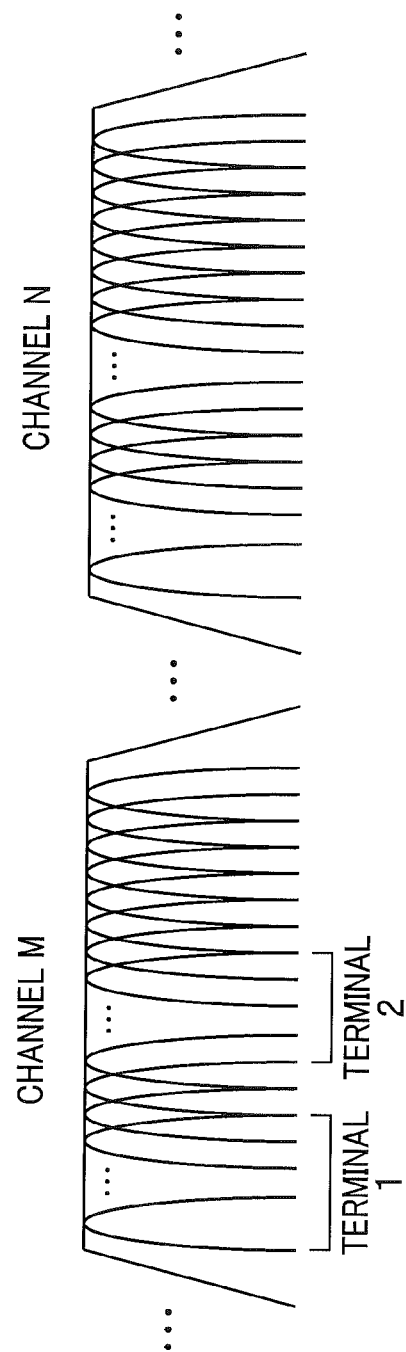
FIG. 20 is a diagram showing an exemplary arrangement of a resource block.

For example, as illustrated in FIG. 20, let it be assumed that a plurality of channels are allocated in a frequency domain and a band width of each channel is, for example, 20 MHz. The frequency domain of the band width of the one channel or a frequency domain of the band width bonding a plurality of consecutive channels (for example, 40, 80 or 160 MHz) corresponds to a consecutive frequency domain. In a consecutive frequency domain, a plurality of frequency-consecutive subcarriers are disposed so as to be orthogonal to each other. One or more resource blocks each including one or a plurality of consecutive subcarriers are assigned to each of the terminals. In the example of FIG. 20, resource blocks are assigned to the terminals 1 and 2 in the frequency domain of one channel. By employing resource blocks respectively assigned to the terminals, simultaneous transmission to the plurality of terminals or simultaneous reception from the plurality of terminals is performed. Such OFDMA communication is especially referred to as "resource-block-based OFDMA communication". In this case, when a "channel" in an embodiment described below is replaced with the "resource block", subsequent embodiments can be similarly applied. In the example shown in FIG. 20, two subcarriers are disposed as guard subcarriers between the resource blocks assigned to the terminals 1 and 2. The number of the guard subcarriers is not limited to two, and the number may be any number more than or equal to one. However, it is not always necessary to dispose the guard subcarrier(s) between the resource blocks assigned to the terminals, and it is also possible not to dispose the guard subcarrier(s) between the resource blocks assigned to the terminals. The number of subcarriers included in each resource block is basically same, but it may be allowed that the number of subcarriers may vary among each resource block. According to the width of the frequency domain to be used in the resource-block-based OFDMA communication, the band width of each subcarrier disposed in the frequency domain may vary. For example, when one channel (for example, 20 MHz) is used in the resource-block-based OFDMA communication, the band width of each subcarrier included in the one channel may be narrower than that of each subcarrier disposed in the frequency domain of the band width of 40 MHz bonding two consecutive channels.

As another mode of the resource-block-based OFDMA communication, it may be allowed that the subcarrier-unit scheme is performed in combination with MU-MC. For example, assignment in subcarrier units or resource block units to terminals is individually performed in each of the plurality of channels of 20 MHz. At this time, the number of subcarriers per one resource block is identical among each channel, but it may be allowed that the number of subcarriers of one resource block varies between channels. One or a plurality of resource blocks in one channel may be assigned to one terminal, or a plurality of resource blocks belonging to a plurality of channels may be assigned to one terminal.

Here, from the viewpoint of backward compatibility, it is required to allow the reception and decoding of PHY packets by at least a basic channel width (a channel width of 20 MHz when a terminal conforming to the IEEE802.11a/b/g/n/ac standards is assumed to be a legacy terminal) of a legacy terminal that is a subject of backward compatibility. Therefore, in a case where it is desired to acquire below-described network allocation vector (NAV) information on a resource block(s), NAV information may be acquired in channel units and NAV information on the channel may be commonly applied to resource blocks included in the channel.

Moreover, as stated above, in the case where the subcarrier-unit scheme is performed in combination with MU-MC, it may be allowed to expand an embodiment based on a channel in MU-MC as described below into an embodiment based on the combination of a channel and a resource block (or subcarrier).

In the following, explanation is continued on the assumption of "channel-based OFDMA communication".

Hereinafter, a description is continued assuming the channel-based OFDMA communication.

Figure 2:
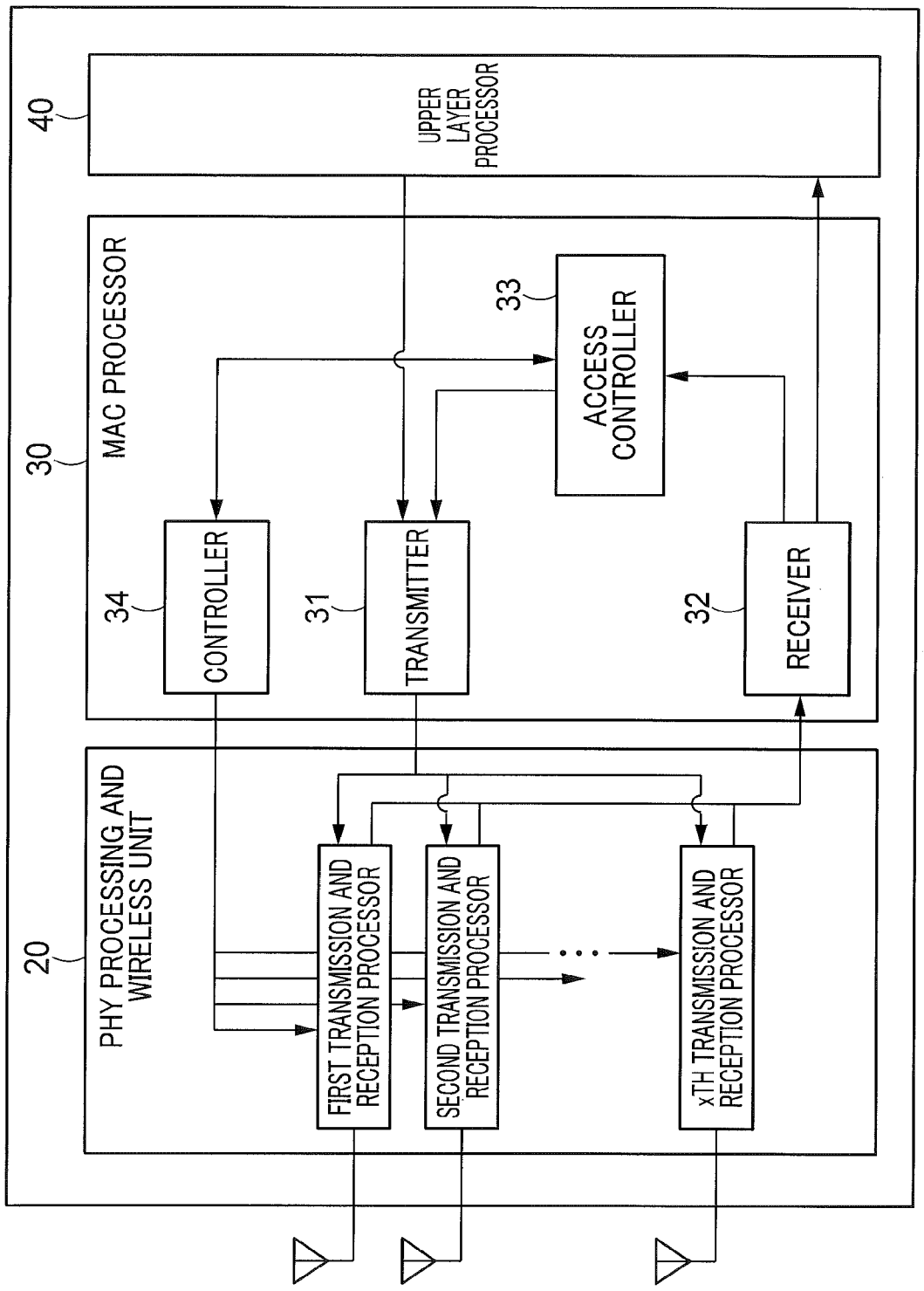
FIG. 2 is a block diagram showing a wireless communication device mounted on the terminal according to the first embodiment.

FIG. 2 is a block diagram of a wireless communication device mounted on the terminal 201. The terminals 202 and 203 also each include the wireless communication device, which has the same configuration as the wireless communication device on the terminal 201, and thus, the description thereof is omitted. The wireless communication device includes an integrated circuit for wireless communication, as an example.

The wireless communication device on the terminal 201 includes one or more antennas, a PHY processing and wireless unit 20, a MAC processor 30, and an upper layer processor 40. The MAC processor 30 includes a transmitter 31, a receiver 32, an access controller 33, and a controller 34, and corresponds to the integrated circuit for wireless communication or communication processing device in the embodiment. The PHY processing and wireless unit 20 includes one or more transmission and reception processors. First to Xth transmission and reception processors with "X" being an integer more than "0" are included. Each transmission and reception processor is connected with an antenna. Here, a controller of the MAC processor 30 is divided into controller 34 and the access controller 33, but they may be integrated into one controller. The PHY processing and wireless unit 20 is configured by an RF integrated circuit as an example, and the MAC processor 30 is configured by a baseband integrated circuit as an example. At this occasion, the RF integrated circuit 20 and the MAC processor 30 may be integrated into one integrated circuit.

As for arrangement of the transmission and reception processor, one transmission and reception processor may be arranged for one channel, or one transmission and reception processor may be arranged for a plurality of channels if the plurality of channels are collectively processed. In the former case, for example, if this wireless communication device can correspond to eight channels at most, eight transmission and reception processors are provided to perform the process for each one channel. In addition, in the example shown in the figure, the antenna is connected for each transmission and reception processor, but one antenna may be connected with the plurality of transmission and reception processors. In this case, each transmission and reception processor may operate in such a manner to extract signals of the channel specified to its own processor by an analog filter or a digital filter or both of them. Information concerning the channel processed by the transmission and reception processors is managed by the controller 34 in the MAC processor 30, and the controller 34 gives an instruction on the channel to be processed to the transmission and reception processors.

The access controller 33 manages an access to the channel and controls frame transmission at a desired timing. The transmitter 31 generates and transmits the frames. When the transmitter 31 is instructed by the access controller 33 to transmit the frames, the transmitter 31 generates the instructed frames and outputs the generated frames to the PHY processing and wireless unit 20. The PHY processing and wireless unit 20 receives one or more frames input from the transmitter 31, and inputs the one or more frames into the corresponding one or more transmission and reception processors. Each transmission and reception processor subjects the frame input from the transmitter 31 to a desired process of physical layer for performing D/A conversion, frequency conversion or the like, and transmits the signals into a space as a radio wave from the antenna. Note that the frame in the embodiment may be not only those called a frame in the IEEE802.11 standard, for example, but also those called a packet.

The access controller 33 and the controller 34 may access a storage device to read out information to be transmitted to the base station or may store information received from the base station in the storage device. The storage device may be a buffer (internal memory) included in the access controller 33 or the controller 34 or both of them, or may be a buffer (external memory) provided externally to the access controller 33 or the controller 34. The storage device may be a volatile memory such as a DRAM or a non-volatile memory such as a NAND, or an MRAM. The storage device may also be an SSD, a hard disk or the like other than the memory.

The PHY processing and wireless unit 20 perform a reception process in a way that each transmission and reception processor 20 extracts from the signal received via the antenna the signal of the corresponding channel, and outputs the processed frame to the receiver 32. The reception process includes a desired physical layer process such as frequency conversion into a baseband, A/D conversion, and analysis or demodulation process of a physical header of the frame after A/D conversion, for example.

The receiver 32 analyzes a MAC header of the frame input from PHY processing and wireless unit 20, and so on. If the receiver 32 determines that the received frame is a data frame from a result of analyzing the MAC header of the received frame, it outputs the frame to the upper layer processor 40 as needed. If the received frame is a management frame or a control frame, the receiver 32 outputs the frame to the access controller 33, and outputs an instruction to generate an ACK frame to the access controller 33 or directly to the transmitter 31 as needed. Note that the management frame is a frame used to manage a communication link with another terminal, and includes a beacon frame, an association request frame (a connection request frame requesting to connect to the base station), an association response frame (a connection response frame that is a response frame to the connection request frame) and the like, as an example. The control frame is a frame used for control in transmitting and receiving (exchanging) the management frame and the data frame to and from another wireless communication device, and includes an RTS (Request to Send) frame, a CTS (Clear to Send) frame, an ACK (Acknowledgement) frame and the like, an example. A description of these data frame, management frame and control frame is given later in detail in another embodiment. The receiver 32 manages carrier sense information via the PHY processing and wireless unit 20. This carrier sense information may contain physical carrier sense information concerning busy and idle of a medium (CCA: Clear Channel Assessment) input from the PHY processing and wireless unit 20, and virtual carrier sense information on the basis of a medium reservation time set in the received frame. If any one of the both carrier sense information indicates a busy state, the medium is considered to be busy and the transmission of the signal is inhibited during the busy state. Note that, in the IEEE802.11 standard, the medium reservation time is set in a Duration field in the MAC header (see FIG. 4 described later). The receiver 32 when receiving the frame addressed to another wireless communication device (not addressed to itself), determines that the medium is virtually busy during the medium reservation time. The scheme of determining that the medium is virtually busy or a period while the medium is determined to virtually be busy is called a NAV (Network Allocation Vector).

Here, a description is given of the process in the case of using the plurality of channels. Assume a state where the terminal 201 is not yet connected with the base station 101. The terminal 201, when wanting to connect with the base station 101, performs the carrier sensing of each channel from the channel 1 to the channel 8 via the PHY processing and wireless unit 20. Results of the carrier sensing of the channels are notified from the transmission and reception processors in the PHY processing and wireless unit 20 to the receiver 32. The access controller 33, which includes a selector for selecting a channel which is wanted to use on the basis of the results of the carrier sensing of the channels, uses the selector to select the channel wanted to use. For example, if the channels 1 and 2 are busy and the channels 3 to 8 are idle, the channel is selected among from the channel 3 to the channel 8. The number of the channels to use may be decided in any way, and may be decided depending on a size of a communication data volume or decided to be equal to or less than a predetermined maximum number. In the latter case, if the number of the idle channels is equal to or more than the maximum number, the maximum number may be applied. Which channel of the idle channels is to be used may be decided on an arbitrary condition. As an example, the channel may be selected so that a condition that the consecutive channels are selected is satisfied. The channels selected here are channels which are requested to the base station to be allocated to the terminal and referred to as usage request channels.

After that, the transmitter 31 in the terminal 201 generates the connection request frame that is the association request frame under the control by the access controller 33. At this time, the association request frame is configured to contain therein usage request channel information specifying the usage request channels. The usage request channels may be specified in any way so long as a usage request channel number can be identified. As an example, assuming the case of specifying the consecutive channels, the specifying may be made in a form of a set of the smallest channel number of the consecutive channels (minimum channel number) and channel width information identifying the desired number of the channels or bandwidth. If one channel width is 20 MHz and two channels are hoped to use, the channel width information is "2" (in the case of the number of the channels) or "40 MHz" (in the case of the bandwidth). There may be used a set of the largest channel number of the consecutive channels (maximum channel number) and the channel width information identifying the desired number of the channels or bandwidth. Alternatively, there may be used a set of the smallest channel number of the consecutive channels (minimum channel number) and the largest channel number (maximum channel number).

The association request frame is transmitted in a way such that one or more channels including at least one predetermined channel are used as an example. For example, as the IEEE802.11ac, in the case where there is the primary channel commonly recognized as a system and the primary channel is assumed to be monitored by the all terminals, at least the primary channel is used for the transmission. Alternatively, the plurality of channels including the primary channel may be used for the transmission, or the all channels supported by the base station 101 may be used for the transmission. If the base station 101 supports the channels 1 to 8, the primary channel may be defined in advance to be the channel 1, for example. Alternatively, the primary channel may be notified by means of the beacon frame.

The receiver 32 in the terminal 201 receives from the base station 101 the association response frame that is a response to the association request frame and determines whether or not the association response frame contains allocation information specifying the channel(s) which is allocated by the base station. If the allocation information is contained, that information is notified to the controller 34. Note that the allocation information may be notified via the access controller 33 to the controller 34, or may be notified directly to controller 34 not via the access controller 33. The controller 34 detects the channel(s) specified in the allocation information as a channel(s) to use from then on, and controls each transmission and reception processor to perform a standby operation at the channel(s). The standby operation is an operation of waiting for the frame transmitted from the base station. For example, this operation may include performing the carrier sensing and putting the corresponding processor into a state to be activated for the process performed when the frame is received. However, as described above, in the case where there is the primary channel commonly recognized as a system and the channel indicated in the allocation information does not include the primary channel, the standby operation may be controlled to be performed also at the primary channel in addition to the channel indicated in the allocation information. The controller 34 may control such that, of the plurality of transmission and reception processors, the transmission and reception processor other than the transmission and reception processor required for the standby operation at the channel inactivates the operation.

Figure 3:
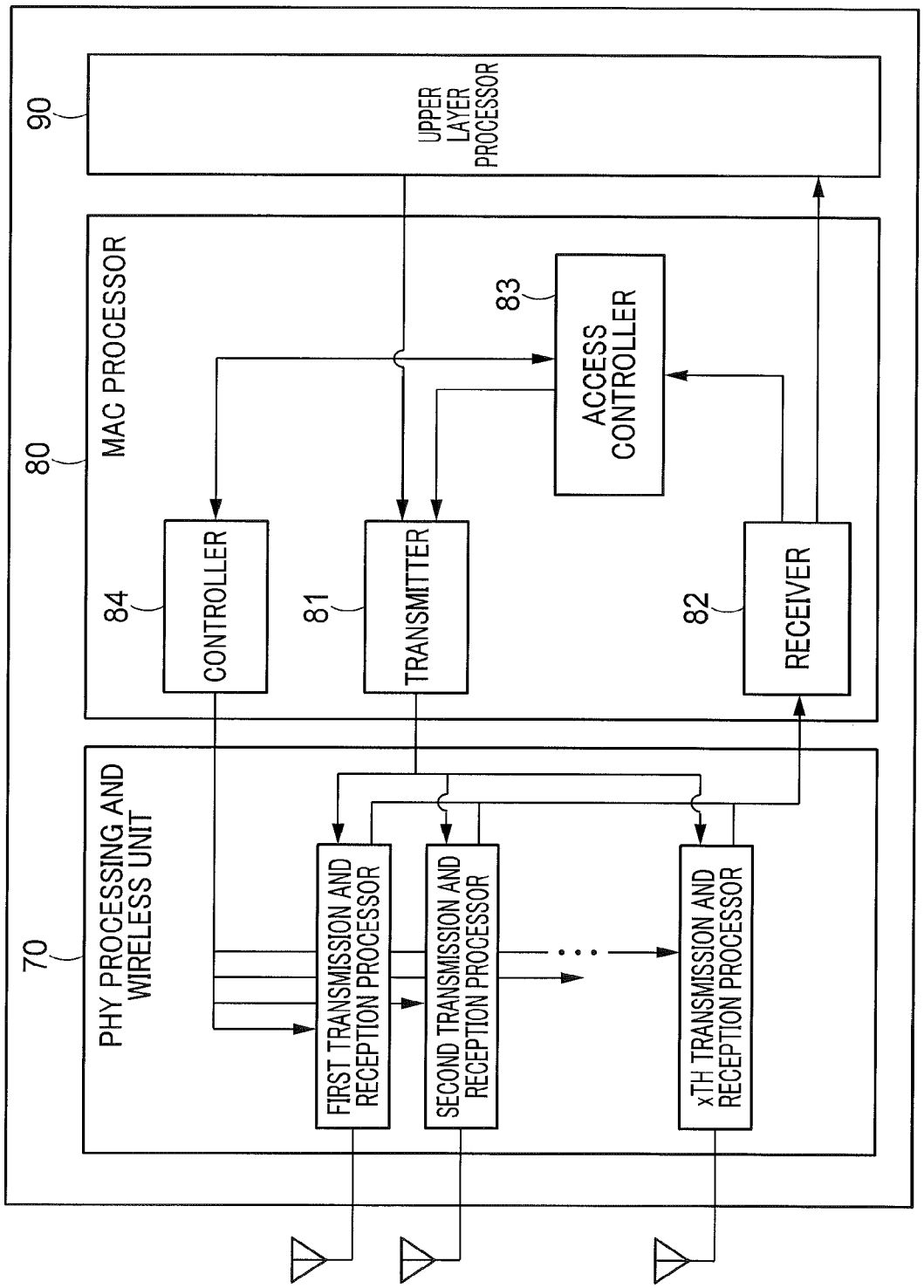
FIG. 3 is a block diagram showing a wireless communication device mounted on the base station according to the first embodiment.

FIG. 3 is a block diagram of a wireless communication device mounted on the base station 101.

The wireless communication device on the base station 101 includes one or more antennas, a PHY processing and wireless unit 70, a MAC processor 80, and an upper layer processor 90. This wireless communication device includes an integrated circuit for wireless communication, as an example. The MAC processor 80 includes a transmitter 81, a receiver 82, an access controller 83, and a controller 84. The PHY processing and wireless unit 70 includes one or more transmission and reception processors. First to Xth transmission and reception processors with "X" being an integer more than "0" are included. Each transmission and reception processor is connected with an antenna. The PHY processing and wireless unit 70 includes an RF integrated circuit as an example, and the MAC processor 80 includes a baseband integrated circuit as an example. At this occasion, the RF integrated circuit 70 and the MAC processor 80 may be integrated into one integrated circuit.

As for arrangement of the transmission and reception processor, one transmission and reception processor may be arranged for one channel, or one transmission and reception processor may be arranged for a plurality of channels if the plurality of channels are collectively processed. In the former case, for example, if this wireless communication device can correspond to eight channels at most, eight transmission and reception processors are provided to perform the process for each one channel. In addition, in the example shown in the figure, the antenna is connected for each transmission and reception processor, but one antenna may be connected with the plurality of transmission and reception processors. In this case, the transmission and reception processor may operate in such a manner to extract signals of the channel specified to the processor by an analog filter or a digital filter or both of them. Information concerning the channels processed by the transmission and reception processors is managed by the controller 84 in the MAC processor 80, and the controller 84 gives an instruction on the channel to be processed to the transmission and reception processors.

The PHY processing and wireless unit 70 perform a reception process in a way to receive the signals via the antenna and extract the signals of the corresponding channel, and outputs the processed frames to the receiver 82. The reception process includes a desired physical layer process such as frequency conversion into a baseband, A/D conversion, and analysis or demodulation process of a physical header of the frame after A/D conversion, for example. The receiver 82 analyzes a MAC header of the frame input from PHY processing and wireless unit 70, and so on. If the receiver 82 determines that the received frame is a data frame from a result of analyzing the MAC header of the received frame, it outputs the processed frame to the upper processor 90 as needed. If the received frame is a management frame or a control frame, the receiver 82 outputs the frame to the access controller 83, and outputs an instruction to generate an ACK frame to the access controller 83 or directly to the transmitter 81 as needed. The receiver 82 also manages the carrier sense information similarly to the wireless communication device on the terminal. As described above, the carrier sense information may contain the physical carrier sense information and the virtual carrier sense information.

The access controller 83 manages an access to the channel and controls frame transmission at a desired timing. The access controller 83 includes a controller or allocator allocating the channel to each terminal, and uses the controller or allocator to allocate the channel to each terminal. The access controller 83 manages channels to be allocated to the terminals. The access controller 83 allocates the channels to the terminals on the basis of the usage request channel information from the terminals. Basically, the channels are allocated to the terminals so as not to duplicate. However, the control may be such that the channel is allocated to duplicate to the terminals and the duplicated channel is not used in actually communicating in a part of the terminals. As an example, the access controller 83, when receiving the association request frame containing the usage request channel information from the terminal 201 described above, decides the channel to be allocated to the terminal 201 based on the usage request channel(s) by of the terminal 201 and the channels having allocated to the other terminals already connected thereto. As an example, if the usage request channels of the terminal 201 are not allocated to any terminal, all of the usage request channels are allocated to the terminal 201.

If a part of the usage request channels of the terminal 201 are already allocated, but the remaining part thereof are not allocated, the remaining part only are allocated to the terminal 201. As in the embodiment described later, a configuration may also be used in which the channel(s) different from the usage request channels requested from the terminal 201 are allocated to the terminal 201.

The access controller 83 instructs the transmitter 81 to generate and transmit the association response frame containing the allocation information which specifies the channel(s) allocated to the terminal 201. The channel(s) may be specified in the allocation information in any way so long as the channel number of the channel(s) allocated to the terminal can be identified. As an example, a form similar to the usage request channel information may be used. In this case, the specifying may be made in a form of a set of the smallest channel number of the allocated channels (minimum channel number) and the channel width information identifying the number of the allocated channels or bandwidth. If one channel width is 20 MHz and two channels are allocated, the channel width information is "2" (in the case of the number of the channels) or "40 MHz" (in the case of the bandwidth). There may be used a set of the largest channel number of the consecutive channels (maximum channel number) and the channel width information identifying the desired number of the channels or bandwidth. Alternatively, there may be used a set of the smallest channel number of the allocated channels (minimum channel number) and the largest channel number (maximum channel number). Note that the terminal is assumed to be allocated to the consecutive channels, but may be configured to be allocated to the channels separately located as described later.

In addition, the access controller 83 uses the channels allocated to the terminals to control so as to simultaneously communicate with the plurality of terminals. As for a communication direction, there are a downlink direction which is from the base station to the terminal and an uplink direction which is from the terminals to the base station. The embodiment assumes the downlink simultaneous communication, but the uplink simultaneous communication may be performed. As a typical example of the simultaneous communication, the base station simultaneously transmits the RTS frame using the all channels allocated to the terminals, and each of the terminals uses a channel by use of which the RTS frame have been received or a channel which was idle for a certain time before the RTS frame to transmit the CTS frame after elapse of a SIFS (Short InterFrame Space) from the completion of receiving the RTS frame. A description of the SIFS is given later in detail in another embodiment. The base station may use the channel by use of which the CTS frame is returned to simultaneously transmit the data frame from the base station after elapse of the SIFS from the completion of receiving the CTS frame. Further, the base station may use the channel by used of which it transmits data frame to simultaneously receive the ACT frames returned from the terminals after elapse of the SIFS from the completion of receiving the data frames. In transmitting the data frame, the base station may binds the consecutive channels per terminal into one frequency band and perform the transmission or MIMO transmission. This can give high-speed communication and robust effects. In the case of the MIMO transmission, information or the like required for the MIMO transmission may be obtained in advance from the terminals by use of the management frame.

The access controller 83 and the controller 84 may access the storage device to read out the information to be transmitted to the terminal or to store the information received from the terminal in the storage device. The storage device may be a buffer (internal memory) included in the access controller 83 or the controller 84 or both of them, or may be a buffer (external memory) provided external to the access controller 83 or the controller 84. The storage device may be a volatile memory such as a DRAM or a non-volatile memory such as a NAND, or an MRAM. The storage device may also be an SSD, a hard disk or the like other than the memory.

The transmitter 81 generates and transmits the frames (management frame, control frame, data frame) under the control by the access controller 83. When the transmitter 81 is instructed by the access controller 83 to generate and transmit the frames, the transmitter 81 generates the instructed frames and outputs the generated frames to the PHY processing and wireless unit 70. If the frame to transmit is the data frame, the data stored in a body field of the data frame is obtained from the upper layer processor 40. The PHY processing and wireless unit 70 inputs one or more frames generated by the transmitter 81, into the corresponding one or more transmission and reception processors. Each transmission and reception processor subjects the frame input from the transmitter 81 to a desired process of physical layer for performing D/A conversion, frequency conversion or the like, and spatially transmits the signals as a radio wave from the antenna.

Figure 4:
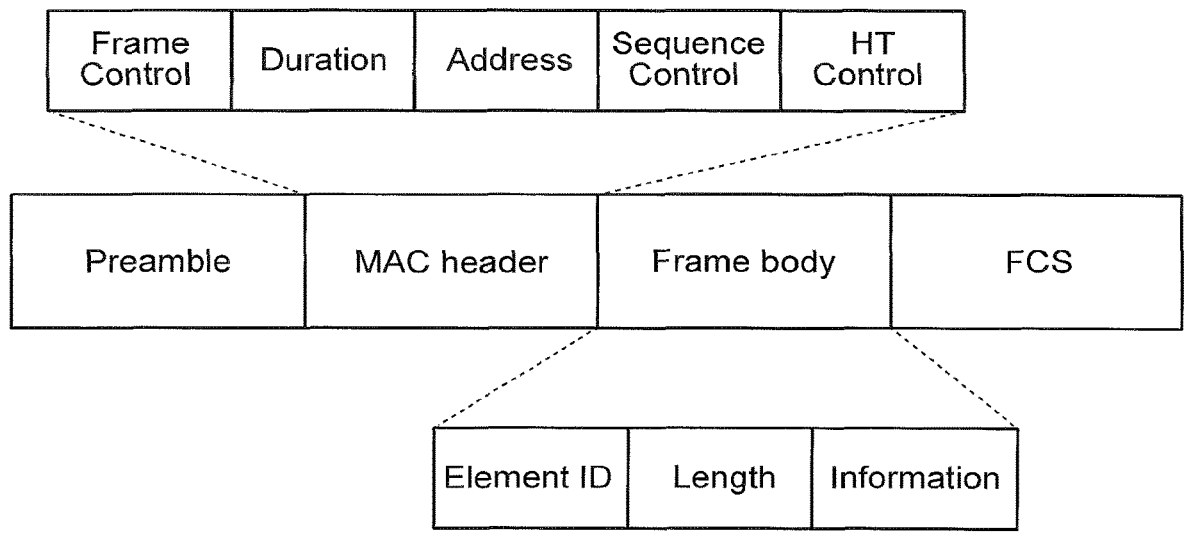
FIG. 4 is a diagram showing an exemplary frame format used in the wireless communication according to the first embodiment.

FIG. 4 shows an exemplary frame format used in the wireless communication according to the embodiment.

The management frame such as the association request frame or association response frame described above has this frame format. This frame format contains fields of a Preamble, a MAC header, a Frame body, and an FCS. The MAC header contains fields of a Frame Control, a Duration, and Address, Sequence Control and an HT (High Throughput) control. However, a frame format not containing the HT Control field and the like may be used. The Address field contains actually a plurality of fields such as a RA (Receiving Address) field storing therein a MAC address of the terminal as a receiving device, and a TA (Transmitting Address) field storing therein a MAC address of the terminal as a transmitting device.

The management frame manages information inserted into the Frame body as an information element in units of an Element ID. The information element is identified by the Element ID and contains an Element ID field, Length field, an Information field. The Information field stores therein content of the information to be notified, and the Length field stores therein information of a length of the Information field. The Frame body can store therein one or more information elements.

Here, the usage request channel information in the embodiment also is notified as the information element by use of the management frame. A name of the information element is defined such as a channel range element, for example, and in the embodiment in the case that the usage request channel information is notified, this channel range element is used.

Figure 5:
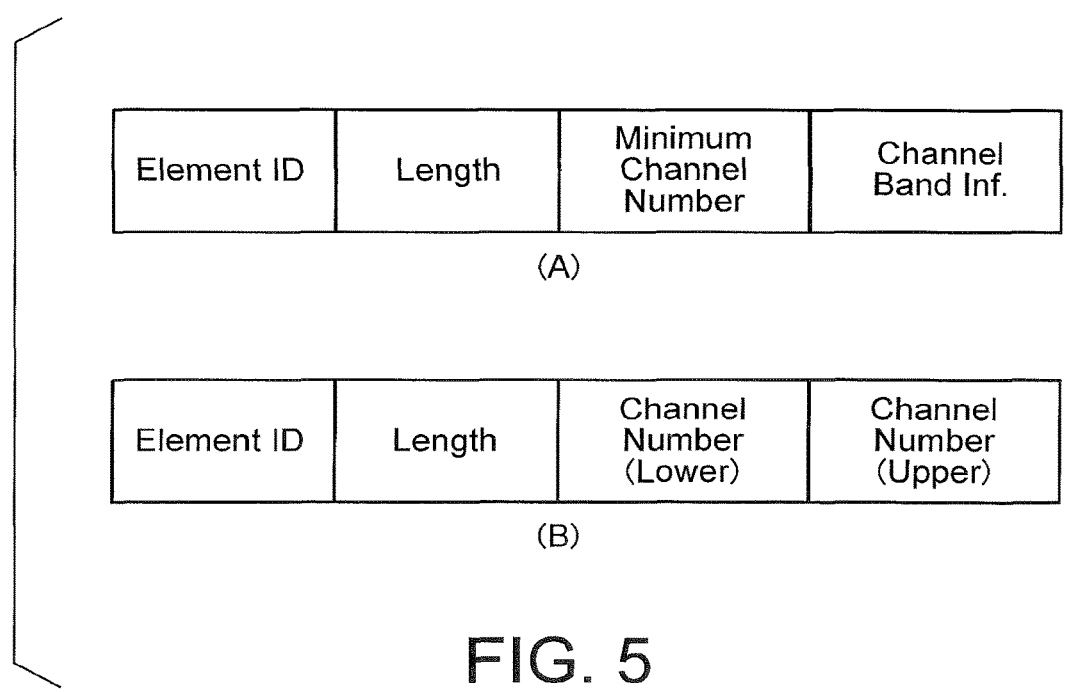
FIG. 5 is a diagram showing an exemplary format of a channel range element according to the first embodiment.
Figure 6:
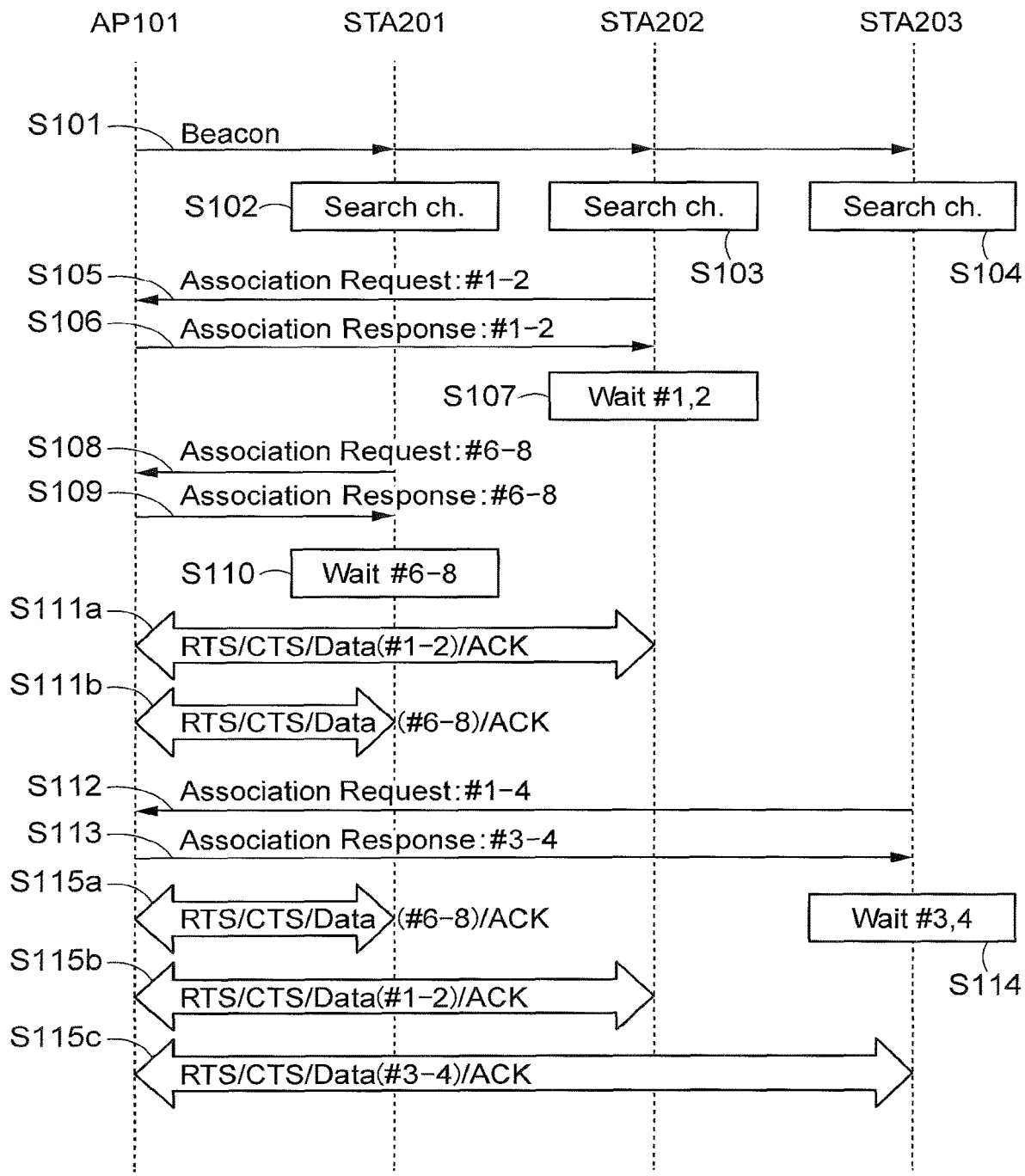
FIG. 6 is a diagram showing a flow of an association process between the base station and the plurality of terminals.

FIGS. 5(A) and FIG. 5(B) each show an exemplary format of the channel range element. In an example in FIG. 5(A), a minimum channel number (Minimum Channel Number) and a channel width information (Channel Band Information) are stored in the Information field as the channel range element. In an example in FIG. 5(B), a minimum channel number (Channel Number (Lower)) and a maximum channel number (Channel Number (Upper)) are stored in the Information field. FIG. 6 is a diagram showing a flow of an association process between the base station 101 and the terminals 201 to 203.

The terminals receive signals of the beacon frame periodically transmitted from the base station 101 (S101), and performs channel search for the channels supported by the base station 101 (S102, S103, and S104). The terminals, by the channel search, recognize that the base station 101 supports the channels 1 to 8.

The terminal 202 decides to use the channels 1 and 2 as the usage request channel through the carrier sensing, and transmits the association request frame containing the usage request channel information to the base station 101 (S105) in order to request the base station 101 to allocate the usage request channel. The usage request channel information for specifying the channels 1 and 2 has, for example, the minimum channel number of "1" and the channel width information (the number of channels or the bandwidth) of "2" or "40 MHz". Alternatively, the minimum channel number is "1" and the maximum channel number is "2". The base station 101, when receiving the association request frame from the terminal 202, allocates the channels 1 and 2 to the terminal 202. The base station 101 transmits to the terminal 202 the association response frame containing the allocation information which specifies the channel numbers "1" and "2" as allocated channels (S106). The allocation information has, for example, the minimum channel number of "1" and the channel width information (the number of channels or the bandwidth) of "2" or. "40 MHz". Alternatively, the minimum channel number is "1" and the maximum channel number is "2". The terminal 202 receives the association response frame transmitted from the base station 101 to confirm the allocation information in the response frame so as to recognize that the channels 1 and 2 are allocated to the terminal 202. Subsequently, the terminal 202 performs by use of the channels 1 and 2 the standby operation including the carrier sensing, signal reception, and signal transmission (S107).

In addition, the terminal 201 decides to request the base station 101 to allocate the channel numbers "6", "7", and "8" through the carrier sensing, and transmits the association request frame containing the usage request channel information which specifies the channel numbers "6" to "8" (S108). The usage request channel information has, for example, the minimum channel number of "6" and the channel width information (the number of channels or the bandwidth) of "3" or "60 MHz". Alternatively, the minimum channel number is "6" and the maximum channel number is "8". The base station 101, when receiving the association request frame from the terminal 201, allocates the channels 6 to 8 to the terminal 201. The base station 101 transmits to the terminal 201 the association response frame containing the allocation information which specifies the channel numbers "6" to "8" as allocated channels (S109). The allocation information has, for example, the minimum channel number of "6" and the channel width information (the number of channels or the bandwidth) of "3" or "60 MHz". Alternatively, the minimum channel number is "6" and the maximum channel number is "8". The terminal 201 receives the association response frame transmitted from the base station 101 to confirm the allocation information in the response frame so as to recognize that the channels 6 to 8 are allocated to the terminal 201. Subsequently, the terminal 201 performs by use of the channels 6 to 8 the standby operation including the carrier sensing, the signal reception, and the signal transmission.

Here, data to be transmitted to the terminals 201 and 202 is generated at the base station 101, and the base station 101 simultaneously transmits the RTS frame to the terminals 201 and 202 by use of respective standby channels in order to acquire a transmission right. It is assumed that the terminals 201 and 202 receive the RTS frame by use the respective standby channels, can receive the RTS frame by use of both channels and/or determine that the carrier sensing has been idle for a predetermined time period before receiving. Then, the terminals returns the CTS frame by use of the respective channels. The base station 101, when receiving the CTS frame from the terminals 201 and 202 by use of the respective channels, acquires the transmission right for the terminals 201 and 202 at their standby channels. The base station 101 simultaneously transmits the data frames including transmission data for the terminals 201 and 202 to the terminals 201 and 202 by use of their standby channel. The terminals 201 and 202 successfully receive the data frames via the channels, and transmit via the channels the ACK frames representing that they successfully receive the data frames after elapse of the SIFS from receiving the data frames (S111a, S111b). In these communications, the channels 1 and 2 are used in communicating with the terminal 202, and the channels 6 to 8 are used in communicating with the terminal 201. Note that if there is a channel via which the RTS frame cannot be received, and/or a channel via which the RTS frame was successfully received but which was busy for a predetermined time period before receiving (CCA or NAV), the terminal may not return the CTS frame via that channel. In this case, the base station 101 does not use that channel for transmitting the data frame.

Next, the terminal 203 decides to request the base station 101 to allocate the channel numbers "1", "2", "3" and "4" through the carrier sensing, and transmits the association request frame containing the usage request channel information which specifies the channel numbers "1" to "4". The usage request channel information has, for example, the minimum channel number of "1" and the channel width information (the number of channels or the bandwidth) of "4" or "80 MHz". Alternatively, the minimum channel number is "1" and the maximum channel number is "4". Since the base station 101 has already set the terminal 201 to the channels 1 and 2, it cannot allocate the channels 1 and 2 to the terminal 203, but determines that the channels 3 and 4 are allocatable which are not allocated to any terminal yet. For this reason, the base station 101 allocates only the channels 3 and 4 to the terminal 203. The base station 101 transmits the association response frame containing the allocation information which specifies the channel numbers "3" and "4" as allocated channels. The allocation information has, for example, the minimum channel number of "3" and the channel width information (the number of channels or the bandwidth) of "2" or "40 MHz". Alternatively, the minimum channel number is "3" and the maximum channel number is "4". The terminal 203 receives the association response frame transmitted from the base station 101 to confirm the allocation information in the response frame so as to recognize that the channels 3 and 4 are allocated to the terminal 203. Subsequently, the terminal 203 performs by use of the channels 3 to 4 the standby operation including the carrier sensing, the signal reception, and the signal transmission.

Data to be transmitted to the terminals 201, 202 and 203 is generated at the base station 101, and the base station 101 simultaneously transmits the RTS frame to the terminals 201, 202 and 203 via respective standby channels in order to acquire a transmission right. The CTS frames are returned from the terminals 201, 202 and 202 respectively via the respective channels, which allows the base station 101 to acquire the transmission right for the terminals 201, 202 and 203 at their standby channels. The base station 101 simultaneously transmits the data frames including the transmission data for the terminals 201, 202 and 203 to the terminals 201, 202 and 203 respectively via their standby channels, and the ACK frames representing that the data frames are successfully received are returned from the terminals 201, 202 and 203 via their channels (S115a, S115b, S115c). In these communications, the channels 1 and 2 are used in communicating with the terminal 202, the channels 6 to 8 are used in communicating with the terminal 201, and the channels 3 and 4 are used in communicating with the terminal 203.

In the process described above, the base station 101 allocates the channels to the terminals so as not to overlap among the terminals, but the base station 101 may allocate all the channels requested by each terminal to each terminal. The base station 101 may select the channels to use for transmission to each terminal when actually transmitting data so that the channels to use do not overlap among the terminals. For example, at step S113, the base station 101 allocates to the terminal 203 all the channels 1 to 4 requested to be allocated, and transmits the allocation information specifying the channels 1 to 4 by way of the association response frame. When transmitting the data to the terminals 202 and 203, the channels to use are appropriately selected so as not to duplicate among the terminals. For example, there may be used the channel 1 of the channels 1 and 2 allocated to the terminal 202, and the channels 2 to 4 of the channels 1 to 4 allocated to the terminal 203 for the transmission to the terminals 202 and 203, and so on. In determining this, the number of the channels to use may be determined with respect to the terminals 202 and 203 depending on a volume of the data to transmit and according to the number of the channels as determined, the channel to use may be selected for each of the terminals 202 and 203. Alternatively, a quality of the channel may be measured for each terminal and according to the quality, the channel to use may be selected for each of the terminals 202 and 203. Other method than those described here may be used for the selection.

Note that in the case where the base station simultaneously transmits the plurality of frames to the plurality of terminals, the transmitted frames may be or may not be the same. In a case where an expression that the base station transmits or receives a plurality of frames or Xth frames is used as a general expression, these frames or Xth frames may be different from or the same as each other. "X" may be set to any value as necessary.

Figure 7:
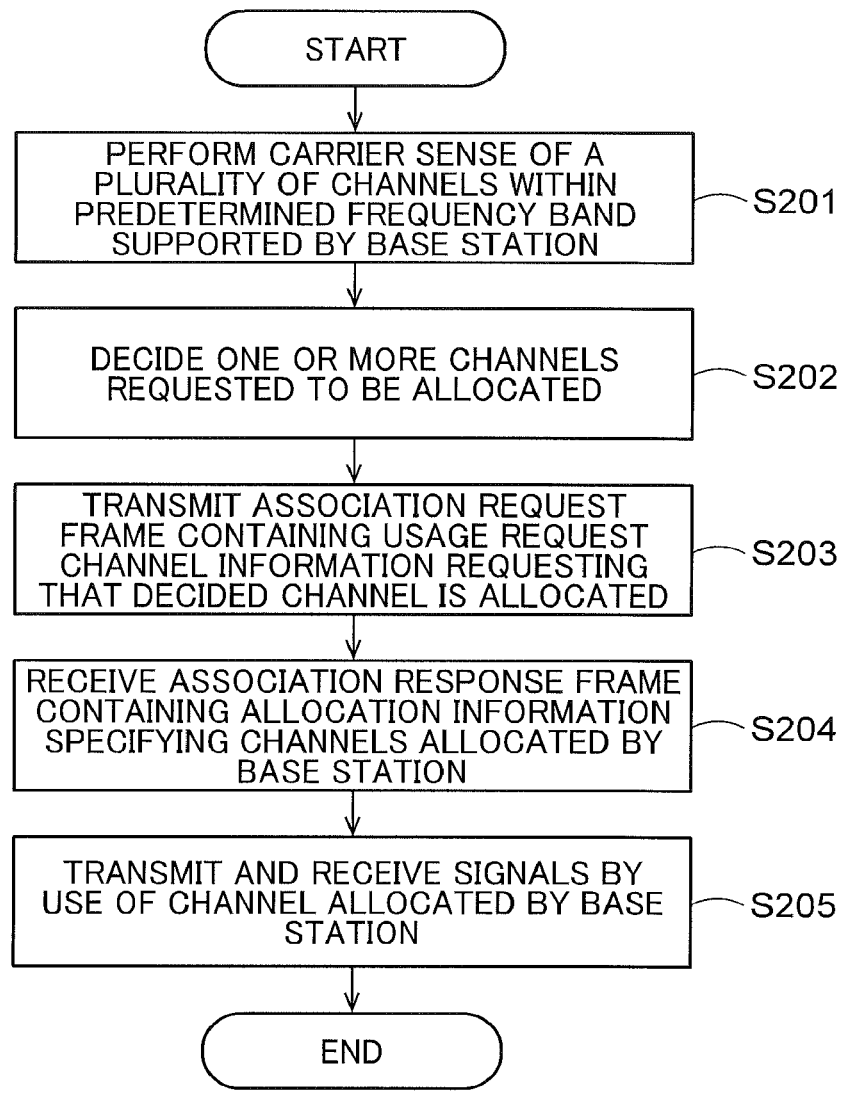
FIG. 7 is a flowchart of an operation of the terminal according to the first embodiment.

FIG. 7 is a flowchart of an operation of the terminal according to the embodiment.

The terminal performs the carrier sensing of a plurality of channels within a predetermined frequency band supported by the base station 101 (S201) to decide one or more channels requested to be allocated (S202). As an example, the terminal decides a plurality of channels so as to select the consecutive channels.

The terminal transmits to the base station 101 the association request frame containing the usage request channel information requesting that the selected channel is allocated (S203). In the case of requesting that a plurality of consecutive channels are allocated, for example, the usage request channel information includes at least one set of the smallest or largest channel number of the consecutive channels and the channel width information identifying the number of the channels or bandwidth requested to be allocated. Alternatively, the usage request channel information includes at least one set of the lowest channel number and the largest channel number of the consecutive channels. Here, the usage request channel information is contained in the association request frame, but may be contained in a reassociation request frame or other management frames (e.g., newly defined management frame) and transmitted.

The terminal receives from the base station 101 the association response frame containing the allocation information which specifies one or more channels allocated by the base station 101 (S204). The terminal extracts the allocation information from the association response frame, and transmits and receives frames to and from the base station via the channels specified in the allocation information to communicate with the base station (S205). For example, the terminal and other terminal together simultaneously perform the downlink reception or the uplink transmission with the base station 101 by using the mutually different channels.

Figure 8:
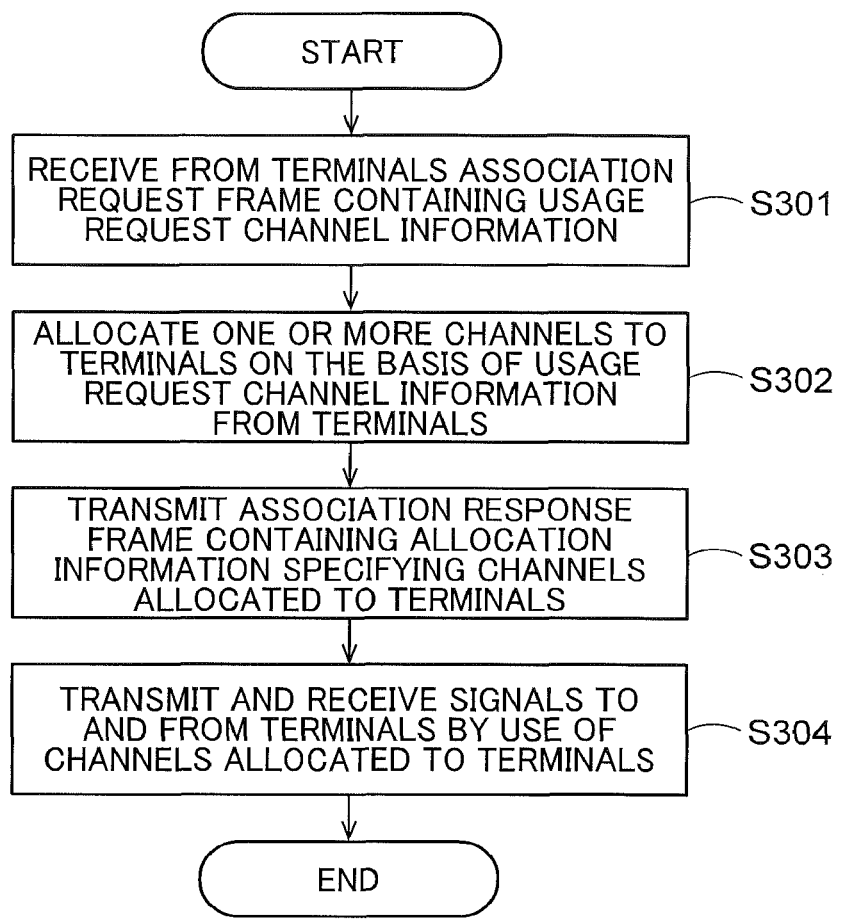
FIG. 8 is a flowchart of an operation of the base station according to the first embodiment.

FIG. 8 is a flowchart of the operation of the base station 101 according to the embodiment.

The base station 101 receives from the terminals the association request frame containing the usage request channel information (S301).

The base station 101 allocates one or more channels to the terminals on the basis of the usage request channel information received from the terminals (S302). As an example, in the case of allocating the plurality of channels to the terminals, the consecutive channels are selected.

The base station 101 generates and transmits to the terminals the association response frame containing the allocation information which specifies the channels allocated to each of the terminals (S303). The allocation information may have a form similar to the usage request channel information, for example. In other words, in the case of allocating the plurality of consecutive channels, the allocation information includes at least one set of the smallest or largest channel number of the consecutive channels and the channel width information identifying the allocated number of the channels or bandwidth. Alternatively, the allocation information includes at least one set of the lowest channel number and the largest channel number of the consecutive channels. Here, the allocation information is contained in the association request frame and transmitted, but may be transmitted by means of the reassociation request frame, the beacon frame or other management frames (e.g., newly defined management frame).

Subsequently, the base station 101 transmits and receives the frames to and from the terminals via the channels allocated to the terminals to communicate with the terminals (S304). For example, the base station 101 uses the channels different from each other among the terminals to simultaneously perform the downlink transmission or the uplink reception with the terminals.

As described above, according to the embodiment, the base station allocates the channels requested by the terminals to the terminals, and the terminals each perform the subsequent standby at only the allocated channel(s), that is, at a minimum necessary channel. The base station uses the channels allocated to the terminals to simultaneously communicate with the terminals. Therefore, as compared with the related art in which the channels are allocated to one terminal as sequentially extending from the primary channel for the communication, in the present embodiment, the number of the terminals simultaneously communicating can be increased and all the channels can be effectively utilized. This allows the utilization efficiency of the whole channels to be improved.

(Second Embodiment)

In the first embodiment, the terminal 201 decides the usage request channel among the channels supported by the base station 101 through the carrier sensing to insert the information of the decided channel into the association request frame. In the embodiment, the association request frame contains the usage request channel information and reason information representing a reason for which the usage request channel is decided. As a form of the reason information, a reason code defined by the IEEE802.11 specification is used in the embodiment. Each reason code is expressed by a corresponding one of numerals. The reason code is associated with a reason defined in advance.

Examples of the reason already defined by the IEEE802.11 specification include "Previous authentication no longer valid" and "4-Way Handshake timeout". However, the IEEE802.11 specification does not define the association request frame as a candidate frame into which the reason code is inserted. Therefore, in the embodiment, the reason code representing the reason to select the usage request channel is inserted into the Frame body field of the association request frame. The base station takes into account the reason code notified by the terminal to be allowed to appropriately allocate the channels to the terminals.

Examples of the reason to select the usage request channel include "channel selected because other channels are busy" and "channel selected but other channels are also available because of no interference (i.e., channel select but not adhere them)". However, the reason regarding other candidate than these may be also defined as the reason code so long as it is so effective that the base station can use for determining the channel allocation.

The IEEE802.11 provides 2 octets as the reason code field, and a number (reason code) associated with the reason is notified via the reason code field. No. 1 to No. 66 are already used, and No. 67 and subsequent numbers are currently reserved and not used. Therefore, for example, No. 67 may be defined for "channel selected because other channels are busy", and No. 68 may be defined for "channel selected but not adhere them". The number to use may be arbitrary so long as it is associated with the reason.

The base station 101, in a case of receiving the association request frame containing the reason code from the terminal, takes into account also that reason code to allocate the channels. This allows the channels to be appropriately allocated, enhancing availability of the channels to improve the utilization efficiency of the channels.

Figure 9:
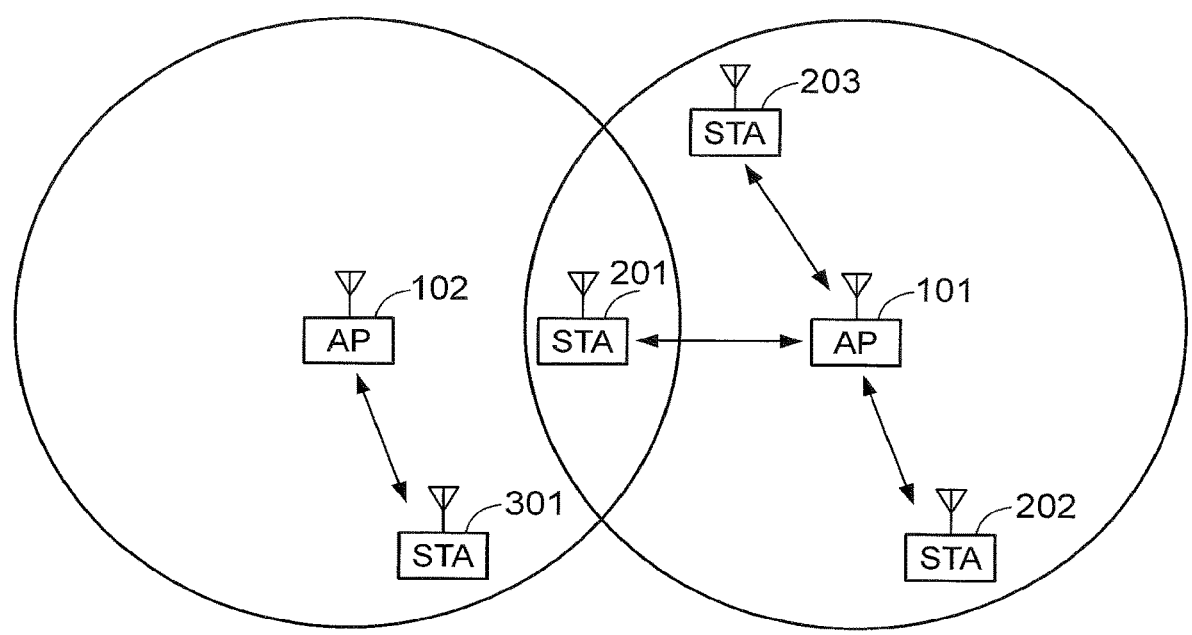
FIG. 9 is a configuration diagram of a wireless communication system including a base station and a terminal according to a second embodiment.

FIG. 9 is a configuration of a wireless communication system according to the embodiment. In addition to the wireless communication group shown in FIG. 1, a wireless communication group is shown in which a base station 102 and a terminal 301 are connected with each other. Coverage areas formed by the base station 101 and the base station 102 partially overlap each other, and in the overlapped area the terminal 201 connected with the base station 101 is located.

Figure 10:
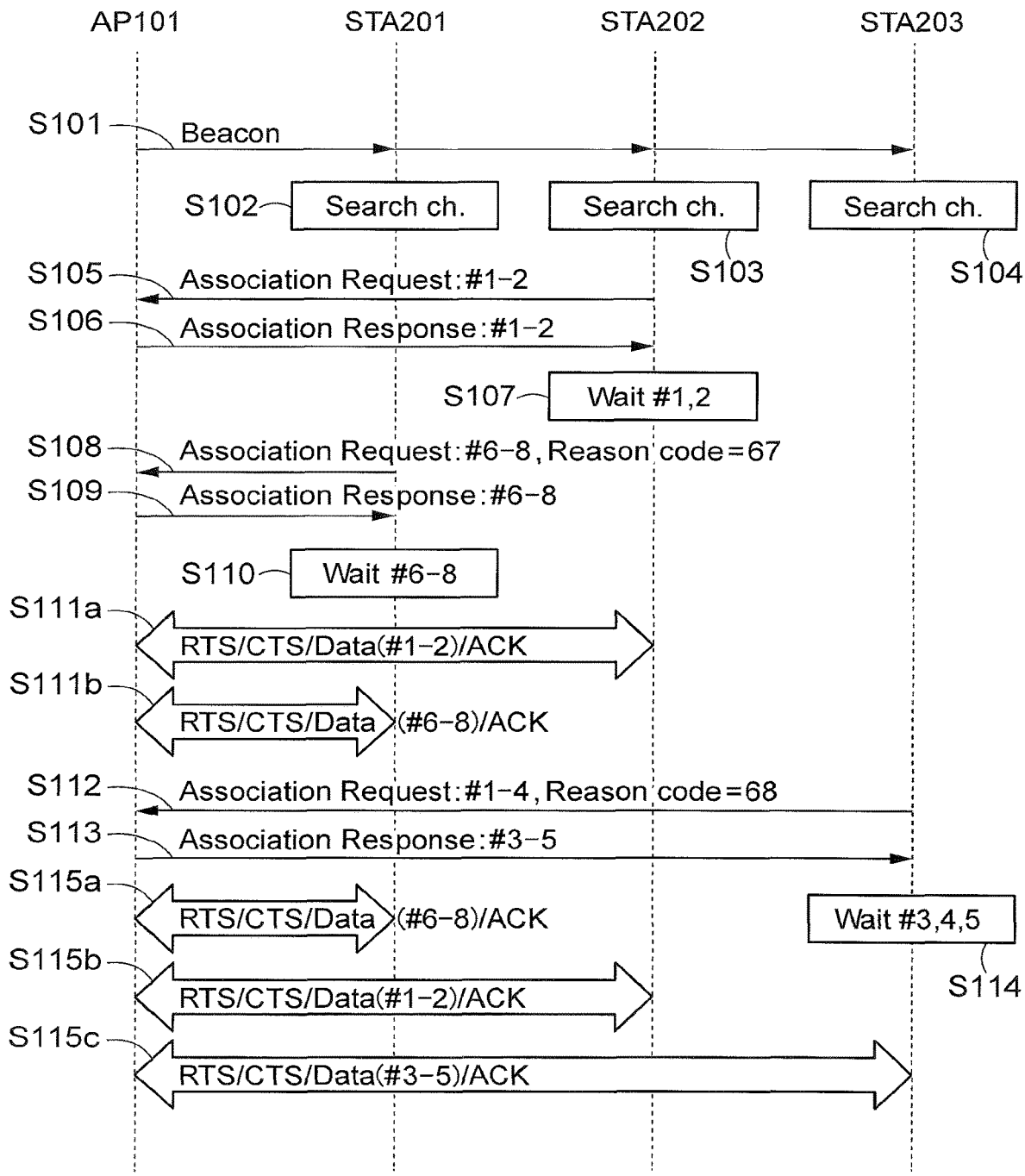
FIG. 10 is a diagram showing a flow of an association process between the base station and the plurality of terminals according to the second embodiment.

FIG. 10 shows a flow of an association process between the base station 101 and the terminals 201 to 203 according to the embodiment. The description of the same portions as in FIG. 6 according to the first embodiment is omitted.

A difference from the flow in FIG. 6 is that the Frame body of the association request frame transmitted from the terminals 201 and 203 to the base station 101 at steps S108 and S112 contains, besides the usage request channel information, the reason code representing the reason to select the channels which are indicated in the usage request channel information.

The terminal 201, in the carrier sensing before transmitting the association request frame at step S108, detects the signals which are transmitted and received between the base station 102 and the terminal 301 in another wireless communication system as busy. In this example, the transmission and reception is performed between the base station 102 and the terminal 301 by use of the channels 1 to 4 and the terminal 201 detects the channels 1 to 4 as busy. The terminal 201 makes the association request frame transmitted to the base station 101 to contain, in addition to the usage request channel information specifying the channels 6 to 8, the reason code indicating that other channels are busy. Assume, for example, that the reason code here is the reason code 67 (that is, other channels are busy) because the carrier sensing results in that the channels 1 to 4 are busy.

The base station 101 determines, from the reason code contained in the association request frame received from the terminal 201, that the channels other than the channels 6 to 8 are difficult to allocate to the terminal 201. Since the channels 6 to 8 are currently not allocated to any terminal and not requested from other terminals to be allocated, the base station determines that the request channels 6 to 8 can be allocated to the terminal 201. The base station 101 allocates the channels 6 to 8 to the terminal 201 and transmits the association response frame containing the allocation information which specifies the channel numbers "6" and "8" to the terminal 201 (S109).

At step S112, the terminal 203, in the carrier sensing before transmitting the association request frame, detects no busy channel and selects the channels 1 to 4 as the usage request channels. The terminal 203 transmits to the base station 101 the association request frame containing, in addition to the usage request channel information specifying the channels 1 to 4, the reason code 68 indicating that other channels may be also used.

The base station 101, when receiving the association request frame from the terminal 203, determines that the channels 3 to 4 can be allocated to the terminal 202, but the channels 1 to 2 which are already allocated to the terminal 202 cannot be allocated to the terminal 203. However, the channel 5 is not requested by the terminal 203, but is available, and thus, it can be determined from the reason code 68 that the channel 5 may be allocated to the terminal 203. Then, the base station 101 allocates, together with the channels 3 and 4, the channel 5 to the terminal 203. The base station 101 transmits to the terminal 203 the association response frame containing the allocation information which specifies the channels 3 to 5 as allocated channels (S113).

Here, the association response frame transmitted from the base station 101 to the terminal may contain the reason code representing the reason why the channel has been allocated, similarly to the association request frame. For example, the reason code is defined as No. 69 which represents that because all or a part of the request channels cannot be allocated, other channels are allocated. The reason code No. 69 may be contained in the association response frame which is returned from base station 101 to the terminal 203 at step S113.

As described above, according to the embodiment, the association request frame is configured to contain the reason code notifying the reason for the terminals to select the channels. This enables to support the determination of the base station on allocating the channels to the terminals. Thereby, the allocation of the channels can be appropriately performed.

(Third Embodiment)

In the IEEE802.11ac and the prior-defined other IEEE802.11 standards, there is one common channel (primary channel) as a system, and the channel width is extended from the primary channel by adding channels in sequence, as described above. This standard has been based on premise that the beacon frame periodically from the base station or the association related management frame (association request frame, association response frame, and the like) is all transmitted and received absolutely by use of the primary channel.

On the other hand, in the above described embodiments according to the invention, the plurality of channels supported by the base station are arbitrarily allocated to the plurality of terminals and the terminals may basically perform the standby operation at the allocated channels. However, in a case where the embodiments according to the invention are applied to a system in which the beacon frame is transmitted only by use of the primary channel of the system in accordance with the existing standard, the terminals need to perform the standby operation at the primary channel in addition to at least the allocated channels. In this case, as compared with the case where the standby operation is performed only at the allocated channel, the channel for the standby operation increases, causing a power consumption of the terminal to increase. Therefore, in the embodiment, the base station transmits the same beacon frame by use of each of the supporting channels. Transmitting a same frame via each of a plurality of channels is called Duplicate transmission.

For example, the base station 101 transmits transmission capability information and reception capability information indicating which channel is capable of transmission and reception, primary channel information identifying which channel is the primary channel, or both of these, by means of the beacon frame via the primary channel, another channel or both of these channels. The terminals determine from the transmission capability information of the base station whether or not the beacon frame is to be subjected to the Duplicate transmission at the channels supported by the base station. Each terminal, if determining that the beacon frame is to be subjected to the Duplicate transmission at the channels, can decide not to need to perform the standby operation at the primary channel. In this case, the terminal may perform the standby operation only at the channels allocated by the base station.

Note that if the Duplicate transmission is performed by use of not all the channels but a part of the channels only, the terminal determines whether or not the channels allocated to the terminal include a channel at which the Duplicate transmission is performed. If the channel at which the Duplicate transmission is performed is included in the channels allocated to the terminal, the terminal may perform the standby operation only at the allocated channel. If not, the standby operation needs to be performed also at the primary channel.

In this way, the base station notifies the transmission and reception capabilities for the channels by means of a notification frame such as the beacon frame and subjects the beacon frame to the Duplicate transmission, allowing the terminals to decrease the channels at which the standby operation is performed. This can reduce the power consumption.

(Fourth Embodiment)

In the first to second embodiments, the terminal performs the standby operation at all the channels allocated by the base station, and in the third embodiment, besides the channels, the standby operation is performed also at the primary channel of the system as needed.

Here, in the case where the beacon frame is subjected to the Duplicate transmission from the base station, the content of the beacon frames received via the channels is the same, and therefore, the standby operation (including the carrier sensing) and the signal reception operation may be performed at a part of the channels, for example, one channel. Additionally, this holds for a case where the RTS frame or the control frame having the similar function in addition to the beacon frame is subjected to the Duplicate transmission from the base station via the channels.

Accordingly, in the embodiment, the terminal performs the standby and signal reception operation only at one channel or a part of the channels allocated by the base station when initially connecting to the base station, and at other allocated channels, performs the carrier sensing only. Further, if one or a part of the channels is previously decided to be used as the standby channel between the base station and the terminal, the base station may transmit the control frame and the like only via the one or a part of the channels.

The terminal receives the RTS frame or the control frame having the equivalent function via one or a part of the channels being the allocated channel (note that the carrier sensing is performed at all the channels). The terminal transmits the CTS frame or the control frame having the equivalent function via the all channels determined to be idle through the carrier sensing. Then, the terminal performs the standby operation at the all allocated channels determined to be idle through the carrier sensing to wait for the data frames reception. The base station transmits data frames via all of the channels to which the CTS frame is returned or a part thereof.

As described above, according to the embodiment, the terminal selects and uses one or a part of the channels allocated by the base station as the channel for the standby operation, reducing the power consumption during the standby.

(Fifth Embodiment)

In the first and second embodiments, the base station 101 is assumed to perform the transmission and reception separately in terms of time. In other words, the base station 101 is assumed to perform either one of the simultaneous transmission and the simultaneous reception by use of the channels. There is not assumed a case where reception timing or transmission timing is different among the channels, or the transmission and the reception are mixed among the channels.

On the other hand, the base station may be provided with a scheme, a so-called Full duplex, which can handle even the mixed transmission and reception. In the Full duplex, the terminal is not restricted to perform the transmission and reception at the same timing as another terminal. Therefore, in this case, the terminal, if detecting that the usage request channels are idle for a predetermined time period through the carrier sensing, may transmit and receive by use of all or a part of the channels the management frame such as the association request frame.

In the embodiment, for example, information indicating whether or not the base station can handle the Full duplex is contained in a Capability field or the like of the beacon frame transmitted from the base station. This information may be predetermined, for example, to have 1 bit and is capable of handling the Full duplex when the bit is "1" and incapable when the bit is "0". Of course, bit association inverse to this may be used. The terminal determines, on the basis of the information contained in the beacon frame from the base station, whether or not the base station can handle the Full duplex.

If the base station can handle the Full duplex, each terminal transmits and receives the association related frames (association request frame, association response frame, and the like) by use of all or a part of the selected usage request channels.

On the other hand, if the base station cannot handle the Full duplex, at least association related frame is transmitted via the channel including at least the primary channel common to the system. In this case, the primary channel is preferably detected as to whether it is busy/idle, by the all terminals, assumed that the all terminals monitor the primary channel. Note that the base station may preferentially allocate the primary channel in allocating the channels. This makes it possible that, in the case of not handling the Full duplex, while the base station simultaneously communicates with the plurality of terminals via the plurality of channels, another terminal detects busy by monitoring the primary channel. This enables that the association related frame be prevented from being transmitted. If the base station communicates with the plurality of terminals via the plurality of channels not including the primary channel and, during the communication, another terminal may determine the primary channel to be idle. In that case, the other terminal may transmit the association related frame at the primary channel but the base station may be possibly not able to successfully receive the association related frame according to its performance depending on the reception timing of the association related frame. This is not limited to the association related frame and holds for other frames.

As described above, according to the embodiment, the base station notifies to the terminal whether or not the base station can handle the Full duplex, and thereby other channels than the primary channel is used to perform the association process. Each terminal can use one or more channels allocated by the base station to communicate with the base station at timing independents from another terminal.

(Sixth Embodiment)

In the first to fifth embodiments, the usage request channels decided by each terminal are assumed to be the consecutive channels. On the other hand, there may be a case, for example, where the channels 3 to 6 of the channels 1 to 8 are already allocated and three channels are hoped to be used. In this case, the consecutive channels are two channels at most, and therefore, three consecutive channels cannot be allocated. Then, an embodiment is shown here in which three channels including the channels separately positioned can be allocated.

Figure 11:
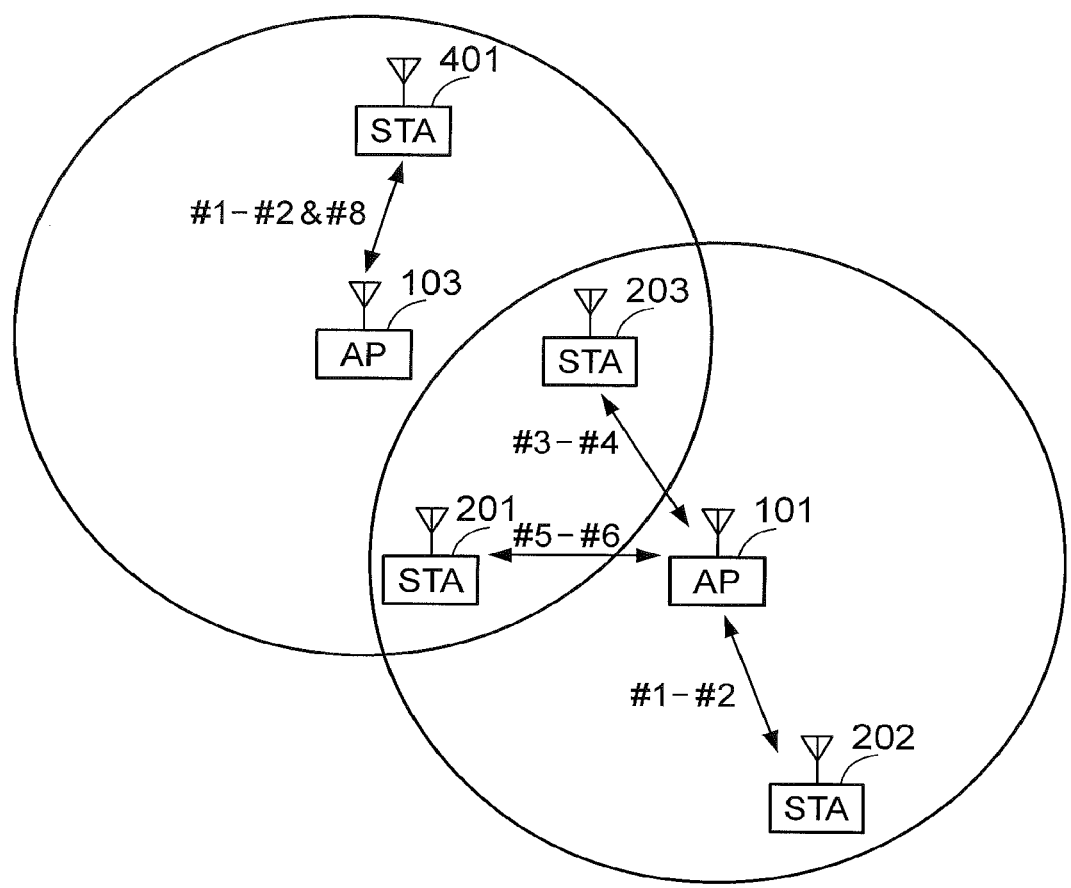
FIG. 11 is a configuration diagram of a wireless communication system including a base station and a terminal according to a sixth embodiment.

FIG. 11 shows a configuration of a wireless communication system including the base station and the terminals according to the embodiment. In addition to the wireless communication group shown in FIG. 1, a wireless communication group is shown in which a base station 103 and a terminal 401 are connected with each other. Coverage areas formed by the base station 103 and the base station 101 partially overlap each other, and in the overlapped area the terminals 201 and 203 connected with the base station 101 are located.

Assume that the base station 101 transmits and receives to and from the terminals 201 to 203 by use of the channels 5 to 6, the channels 1 to 2, and the channels 3 to 4, respectively as shown in the figure. Assume that the terminal 401 wanting to connect with the base station 103 determines from the results of the carrier sensing that interference exists in the channels 3 to 6 and selects the usage request channel from among other channels.

There are choices for the terminal 401 of two channels at most if the consecutive channels are desired, and four channels at most if the consecutive channels are not desired. Which to select in practice may depend on a condition such as a processing capability of the PHY processing and wireless unit 20 or a required transmission rate determined depending on the request from the application. Hereinafter, a method is shown for notifying the selected channel to the base station 101 in a case where the terminal 401 selects the plurality of channels which are not consecutive channels as the usage request channels.

Figure 12:
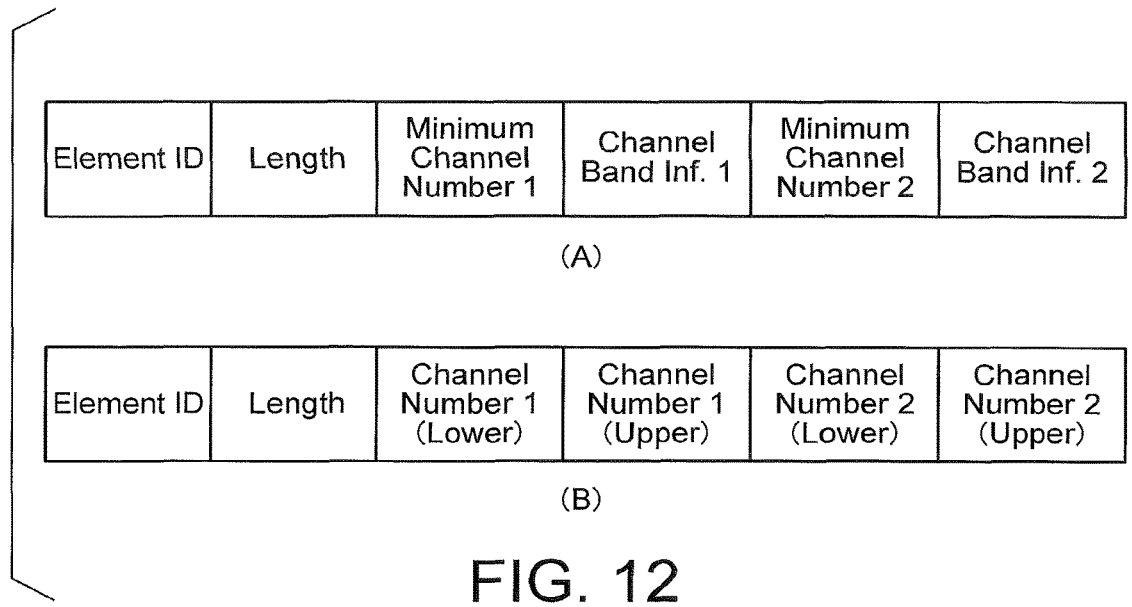
FIG. 12 is a diagram showing an exemplary format of a channel range element according to the sixth embodiment.

FIGS. 12(A) and 12(B) each show an exemplary format of a channel range element according to the embodiment. The channel range element is contained in the management frame such as the association request frame and the association response frame.

Similar to the first embodiment, the Information field basically contains a set of the minimum channel number (Minimum Channel Number) and the channel width information (Channel Band Information), or a set of the minimum channel number (Channel Number (Lower)) and the maximum channel number (Channel Number (Upper)). However, if the plurality of channels not consecutive are requested as in the embodiment, the Information field contains a plurality of the sets.

For example, if the channels 1 and 2 and the channel 8 are desired to be used, a set of a minimum channel number 1 and a channel width information 2, and a set of a minimum channel number 8 and a channel width information 1 are set in the Information field as in FIG. 12(A). Alternatively, a set of the minimum channel number and the maximum channel number 2, and a set of the minimum channel number 8 and the maximum channel number 8 are set in the Information field as shown in FIG. 12(B). In this case, the Length field is set to a corresponding length such that the reception side may find that the plurality of sets are contained.

Note that the embodiment shows the case where a non-consecutive portion in the channels is one, but even two or more non-consecutive portions may be dealt with by further adding a set in a form similar to the above to the Information field.

(Seventh Embodiment)

In the first to sixth embodiments, the case of the channel-based OFDMA is described, but the embodiment describes a case of a resource block-based OFDMA. Here, assume that a band of one channel includes a plurality of subcarriers orthogonal to each other, and one or more adjacent subcarriers are used as the resource block to allocate the subcarriers to the terminals in units of resource block for performing the communication. However, the number of the channels to use is not limited to one and a plurality of channels may be used. In this case, the plurality of resource blocks belong to each channel. In other words, a plurality of resource blocks are included in each of the plurality of channels. Further, rather than that the resource blocks are set per channel, a plurality of resource blocks may be set for a plurality of subcarriers arranged in one band into which the plurality of channels are bundled so as to allocate the resource blocks to the terminals.

In the case of the resource block-based OFDMA, the terminals perform not the usage request of the channel(s) but a usage request of the resource block(s). In this case, the terminal determines conditions of the resource blocks when determining which resource block the usage request is made for. For example, on the basis of received powers of signals of the resource blocks received from the base station, the resource block for which the usage request is made (usage request resource block) may be preferentially selected from the resource blocks of higher received power. The terminals notify information specifying the selected usage request resource blocks (usage request resource block information) to the base station. The base station decides the resource blocks to be allocated to the terminal from among the resource blocks specified in the information and allocates the decided resource blocks to the terminal. The number of the resource blocks allocated to the terminal may be a predetermined number (e.g., one), or may be the number of all or less than all of the resource blocks which the terminal requests to allocate thereto depending on a condition of allocation of the resource blocks. The base station transmits to the terminal allocation information which specifies the resource blocks allocated to the terminal. Alternatively, rather than that the allocation information is transmitted by way of the frame in advance before the OFDMA transmission, the allocation information may be notified using the SIGNAL field in the physical header relating to the data frames which are multiplexing transmitted by way of the OFDMA. Note that the carrier sensing is performed in unis of channel similarly to the above embodiments, and if one channel is busy, all of the resource blocks belonging to the one channel may be determined to be busy. However, the carrier sensing may be configured to be performed in units of a resource block.

Here, the frame for which the received power is measured by the terminal may be any frame transmitted from the base station. It may be the beacon frame, other management frames, the control frame, the data frame or all of these. For the measurement of the received power, a predetermined field of the Preamble in the physical header (field whose bit is known) may be used. For example, the base station may transmit the frames for each resource block such that the terminal measures the received power using the physical header of each frame. The received power may be based on an SINR, an SNR or other indexes. The determination may be made based on not the received power but an MCS. For example, the terminal may preferentially select the resource block from the resource blocks by which the MCS having the highest transmission rate can be used. Note that if the base station transmits the frames simultaneously via the resource blocks, parts of a head side of the physical headers of the frames may be a common content portion and may be transmitted via an entire band of one channel including the resource blocks. The subsequent of the parts of the head side may be different content portions among the frames and may be transmitted via the respective ones of the resource blocks. In this case, the subsequent portions transmitted via the respective ones of the resource blocks may have a field for storing a known bit sequent, respectively. The bit sequence stored in this field may be used to measure the received power.

As a method for notifying by the terminal the usage request resource block information to the base station, the management frame such as the association request frame or a newly defined management frame may be used similarly to the above embodiments. In this case, the information element containing the usage request resource block information may be set in the Frame body field of the management frame. In this case, a format of the information element may be defined in accordance with the formats shown in FIGS. 5(A) and 5(B) or FIGS. 12(A) and 12(B). Alternatively, the usage request resource block information may be set not in the newly defined management frame, but in any field in the physical header of the data frame, control frame, or both of these. Examples of the control frame include the RTS frame, the CTS frame, and the ACK frame. By the data frame, the control frame, or both of these be using, the usage request resource block information can be notified during data reception/transmission, on starting the data reception/transmission, and on ending the data reception/transmission.

Figure 21:
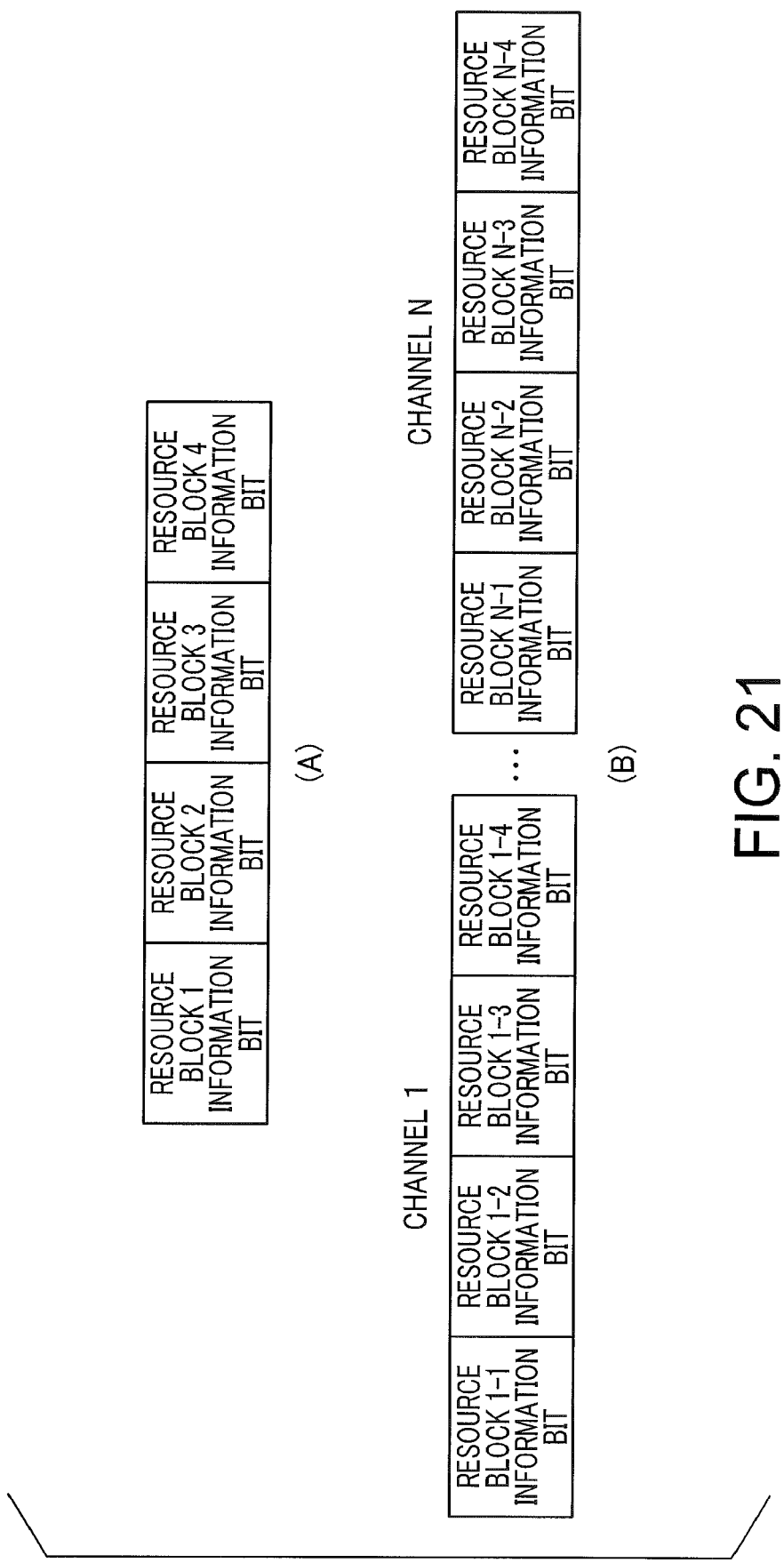
FIG. 21 is a diagram showing an exemplary format of information specifying a resource block which is requested to be used.

FIG. 21(A) shows an exemplary format of the usage request resource block information. Whether or not the resource block (usage request) is specified is represented using a bit, and there are fields whose number is the number of bits that is the number of the resource blocks. In this case, four resource blocks are arranged in one channel, and thus, four fields (resource block Information fields) are provided. If the resource block is specified, the corresponding field is set to "1", if not specified, set to "0". If the resource blocks 1 and 2 are specified and the resource blocks 3 and 4 are not specified, values of a resource block 1 Information field to a resource block 4 Information field are set to "1","1", "0", and "0", respectively. If two or more channels are used, similar formats whose number is the number of the channels (here, N channels are used) may be arranged, as shown in FIG. 21(B). In the case of FIG. 21(B), the usage request channel and the resource block which is requested to be used in the usage request channel are specified.

Figure 22:
FIG. 22 is a diagram schematically showing a physical packet containing a physical header and a MAC frame.

Here, if the usage request resource block information is notified through the physical header of the data frame or control frame, the notification may be made specifically as below. FIG. schematically shows a physical packet configuration containing the physical header and the MAC frame. As shown in FIG. 22, a L-STF, a L-LTF, and a L-SIG are arranged on the head side of the physical header, and followed by a new field provided between the former fields and the MAC frame (or the existing field is used), all or a part of which new field may be set to the usage request resource block information. Note that the L-STF, the L-LTF, and the L-SIG are fields capable of being recognized by the terminal of a legacy standard such as the IEEE802.11a (terminal incapable of performing the OFDMA communication according to the embodiment) ("L" represents "legacy"), and have stored therein information such as on signal detection, frequency correction, and transmission rate.

The data frame or the control frame through which the usage request resource block information is notified may be a frame transmitted by way of the ordinal communication when the OFDMA communication is not performed (communication by use of one channel) or a frame transmitted using the resource block in the OFDMA communication. Note that a part on the head side of the frames transmitted from the terminals to the base station in the OFDMA communication may be transmitted to the terminals by use of a band of 20 MHz if one channel width is 20 MHz, and the later portion may be transmitted by use of the resource block for each terminal. At this occasion, the content of the part on the head side may be common to the terminals. Specifically, the part on the head side may include the fields of the L-STF, the L-LTF, and the L-SIG and may further include a part of fields arranged thereafter (field between the L-SIG and the MAC frame) as an example. The new preamble field described above may be included in a part on the head side or in the field on the later side thereof.

Note that, in the embodiment, as described at the beginning in the first embodiment, by replacing the channel in the first to sixth embodiments and eighth and subsequent embodiments with the resource block, various modifications or extensions or both of these may be made. For example, the "channel" may be read as the "resource block", the "channel width information" may be read as "resource block width information", and the "channel number" may be read as the "resource block number".

As an example of reading as another, in the third embodiment, if a predetermined channel such as the primary channel does not belong to the channels specified in the allocation information, the standby operation is performed at the predetermined channel. This may be read as below: if the resource block specified in the allocation information does not belong to the predetermined channel, the standby operation is performed also at the predetermined channel (assuming the case of performing the carrier sensing in units of channel).

As a further example of reading, another example is shown below. In the fourth embodiment, the standby waiting for the frame and the signal reception are performed at a part of the channels specified in the allocation information and the carrier sensing is performed at other channels than those. If the RTS frame is received by use of the channel at which the standby is performed, the CTS frame is transmitted by use of the received channel and the channel determined to be idle through the carrier sensing. This may be read as below: the standby waiting for the frame and the signal reception are performed at a part of the resource blocks specified in the allocation information, and the carrier sensing is performed at other resource blocks than those; then, if the RTS frame is received by use of the resource block at which the standby is performed, the CTS frame is transmitted by use of the resource block receiving the RTS frame and the resource block determined to be idle through the carrier sensing.

In a similar way, various portions in the embodiments may be adequately read as another to configure embodiments.

(Eighth Embodiment)

In the first to fourth embodiments, in transmitting and receiving the association related frame when initially connecting, the channels are allocated to the terminal, and after that, those channels are successively used. However, the channel condition varying after that may cause the proper channel to change from the initially decided channel. Therefore, an embodiment is shown in which the channel to use is changed during the connection, depending on the channel condition.

As the frame used in order to change the channel to use, there may be used the reassociation request frame and the reassociation response frame which are already defined by the IEEE802.11 specification. It may be considered that by means of these request frame and response frame, the same Element ID as of the channel range element described in the first to fourth embodiments is used to notify the usage request channel information specifying the channel desired to be newly used and the allocation information specifying the channel newly allocated. A frame type of the reassociation request frame and reassociation response frame is different from that of the association request frame and association response frame, but the channel range element stored in the Frame body may have a form similar to that in FIGS. 5(A) and 5(B) and FIGS. 12(A) and 12(B).

Figure 13:
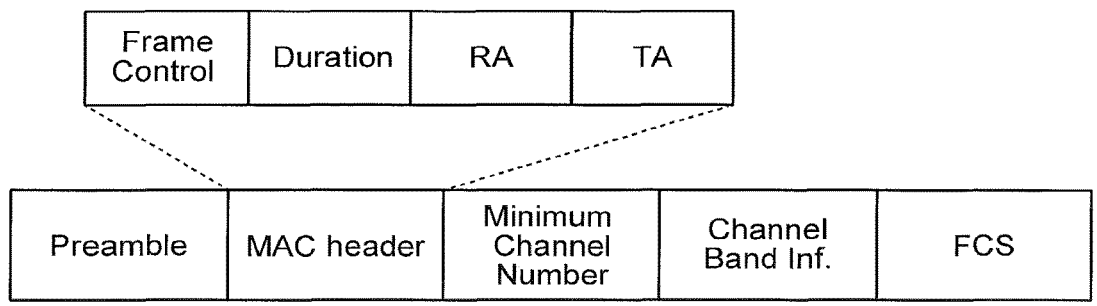
FIG. 13 is a diagram showing an exemplary format of a state change frame according to the seventh embodiment.
Figure 14:
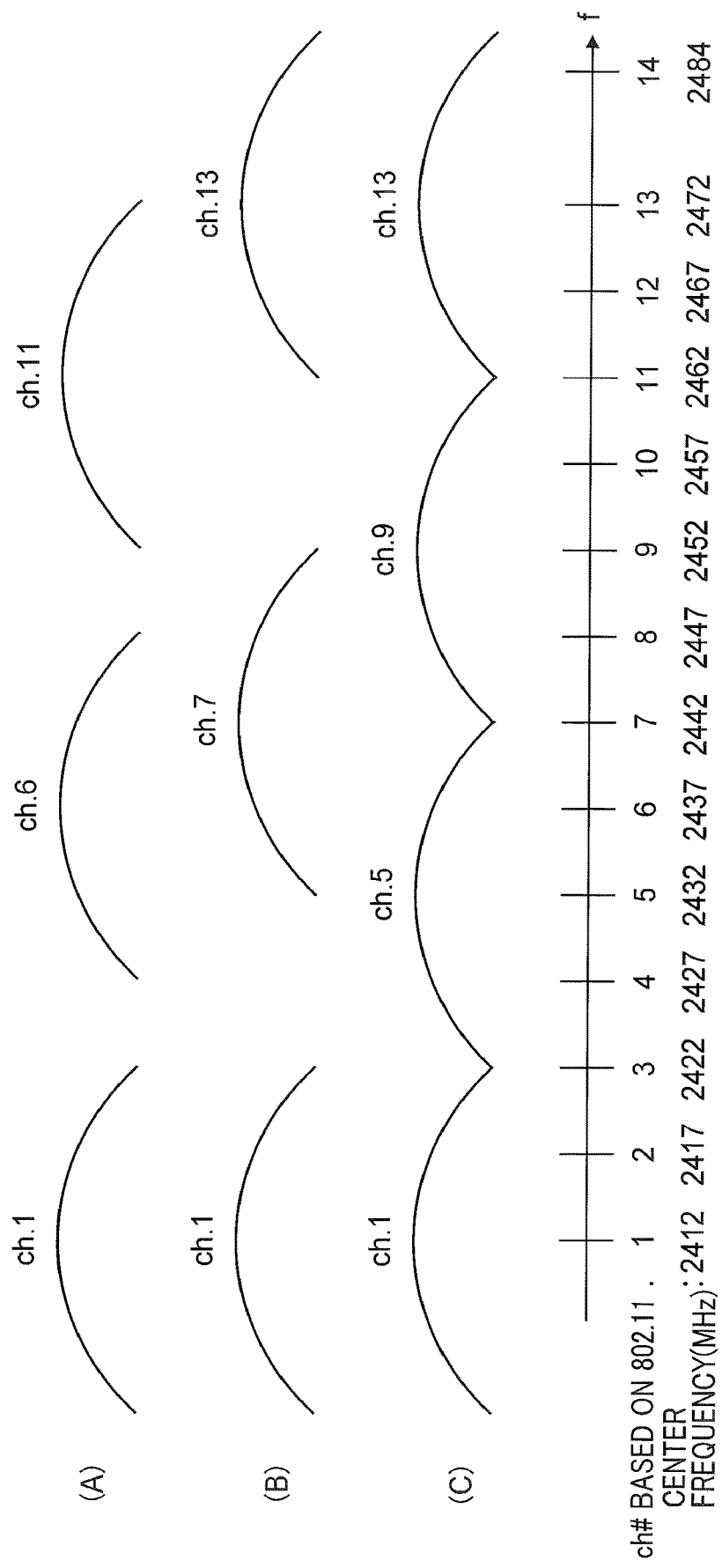
FIG. 14 is a diagram illustrating a meaning of the channels being consecutive.

As other method than the above, a state change frame may be newly defined as the new management frame and used. FIG. 13 shows an exemplary format of a state change frame. A set of the minimum channel number (Minimum Channel Number) and the channel width information (Channel Band Information) is added as additional information after a frame header of the frame. In place of the set of the minimum channel number and the channel width information, a set of the minimum channel number (Channel Number (Lower)) and the maximum channel number (Channel Number (Upper)) may be added. Alternatively, other format than that shown here may be used. The content of the frame header may be other than that shown in the figure.

As described above, according to the embodiment, not only when initially connecting but also during the connection, the channel to use is updated depending on the channel condition, allowing the channel to be effectively used.

(Ninth Embodiment)

In the first to eighth embodiments, the channels in a predetermined frequency band are the channels 1 to 8 at most and these channels are consecutive. Below, a supplementary description is given of this continuity of the channels.

The channel numbers in the IEEE802.11 standard are provided at 5 MHz intervals, therefore, in the case of a channel width of 20 MHz, an interval between channel numbers at which channels do not overlap is 4. In the present embodiment, consecutive channels in a channel set mean consecutive channels that do not overlap. The channel numbers in the embodiment are for convenience, and ch. 1 should be interpreted as channel number 36 in the 5 GHz band in the IEEE802.11 standard and ch. 2 should be interpreted as channel number 40 in the 5 GHz band in the IEEE802.11 standard.

[5 GHz Band]

In the 5 GHz band of IEEE802.11 standard, since channel numbers are basically used at 20 MHz intervals, there is no problem in considering based on the actually used channel numbers.

[2.4 GHz Band]

On the other hand, in the 2.4 GHz band, as illustrated in FIG. 24, reference channel selection is performed at 25 MHz intervals (FIG. 24(A)) in such as North America and China, and at 30 MHz intervals (FIG. 24(B)) in Europe. Therefore, it may be performed at 25 MHz intervals (FIG. 24(A)) mirroring the selection for North America and China where, for example, ch. 1 in the specification may be set to channel number 1 in the 2.4 GHz band in IEEE802.11 standard and ch. 2 may be set to channel number 6 in the 2.4 GHz band in IEEE802.11 standard. Alternatively, it may be performed at 30 MHz intervals (FIG. 24(B)) mirroring the selection for Europe where, for example, ch. 1 in the specification is set to channel number 1 in the 2.4 GHz band in the IEEE802.11 standard and ch. 2 is set to channel number 7 in the 2.4 GHz band in the IEEE802.11 standard. Alternatively, as illustrated in FIG. 24(C), mirroring the 20 MHz channel intervals in the 5 GHz band, ch. 1 in the specification may be set to channel number 1 in the 2.4 GHz band in IEEE802.11 standard and ch. 2 may be set to channel number 5 in the 2.4 GHz band in IEEE802.11 standard. FIG. 24(C) exemplifies a future possible channel selection other than the ones in FIG. 24(A) and FIG. 24(B). However, in the case of such as North America, China and Europe, when another wireless communication system selects, as at least part of the channels, channel number 6 or 7 in the 2.4 GHz band, the frequency band partially overlaps with that of channel number 5. In this case, a frequency band in which mutual wireless communication systems influence each other broadens, and channel utilization efficiency decreases.

(Tenth Embodiment)

Figure 15:
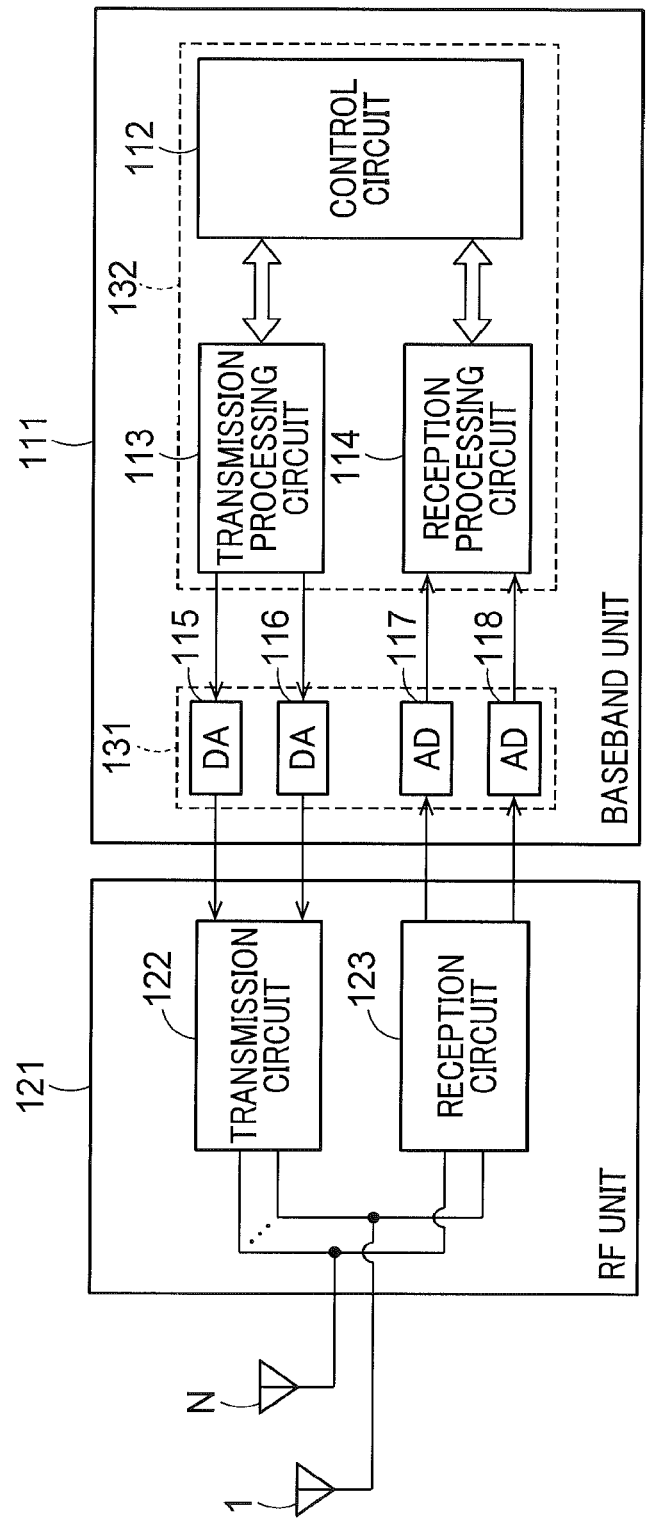
FIG. 15 is a diagram showing an exemplary hardware configuration of the wireless communication device mounted on the terminal according to the first embodiment.

FIG. 15 illustrates a hardware configuration example of a wireless communication device provided in a terminal according to the present embodiment. This hardware configuration is one example, various changes being applicable to the hardware configuration. Since the operation of the wireless communication device illustrated in FIG. 15 is similar to the wireless communication device of the terminal described above in FIG. 2, the description below is centered on the differences in hardware configuration and detailed operation explanations have been omitted.

This wireless communication device includes a baseband unit 111, an RF unit 121 and antennas 1 to N.

The baseband unit 111 includes a control circuit 112, a transmission processing circuit 113, a reception processing circuit 114, DA conversion circuits 115 and 116 and AD conversion circuits 117 and 118. The RF unit 121 and the baseband unit 111 may be collectively configured as IC (Integrated Circuit) chip or may be configured as individual chips.

As one example, the baseband unit 111 is a baseband LSI or a baseband IC or both of them. Alternatively, as shown by a dotted line frame in the figure, the baseband unit 111 may include an IC 132 and an IC 131. At this time, the circuits may be divided between each IC such that the IC 132 includes the control circuit 112, the transmission processing circuit 113 and the reception processing circuit 114, while the IC 131 includes the DA conversion circuits 115 and 116 and the AD conversion circuits 117 and 118.

The control circuit 112 corresponds, as one example, to a communication controlling device for controlling communication, or a controller (or controlling circuitry) for controlling communication. At least one of the transmission processing circuit 113 or the reception processing circuit 114 may be included in the communication controlling device or the controller (or controlling circuitry). At this point, the wireless communicator may include the transmission processing circuit 113 and the reception processing circuit 114. The wireless communicator may further include the DA conversion circuits 115 and 116, and the AD conversion circuits 117 and 118, in addition to the transmission processing circuit 113 and the reception processing circuit 114. The wireless communicator may even further include a transmission circuit 122 and a reception circuit 123, in addition to the transmission processing circuit 113, the reception processing circuit 114, the DA conversion circuits 115 and 116, and the AD conversion circuits 117 and 118. The integrated circuit according to the present embodiment may include a processor that performs all or a part of the process of the baseband unit 111, that is, all or a part of the processes of the control circuit 112, the transmission processing circuit 113, the reception processing circuit 114, the DA conversion circuits 115 and 116, and the AD conversion circuits 117 and 118.

Alternatively, the IC 132 may correspond to the communication controlling device for controlling communication. At this point, the wireless communicator may include the transmission circuit 122 and the reception circuit 123. The wireless communicator may further include the DA conversion circuits 115 and 116, and the AD conversion circuits 117 and 118, in addition to the transmission circuit 122 and the reception circuit 123.

The control circuit 112 chiefly executes the functions of the access controller 33, the controller 34, the transmitter 31 and the receiver 32. The function of the upper layer processor 44 may be included in the control circuit 112. The control circuit 112 may include a clock generator. The transmission processing circuit 113 corresponds to a component that performs PHY layer processing on each transmission and reception processor in the PHY processing and wireless unit 20 illustrated in FIG. 2. That is, the transmission processing circuit 113 performs processing such as adding of preamble and PHY header, coding and modulation. The reception processing circuit 114 corresponds to a component that performs reception processing in the PHY layer on each transmission and reception processor in the PHY processing and wireless unit 20 illustrated in FIG. 2. The reception processing circuit 114 performs processing such as demodulation, decoding and preamble and PHY header analysis and creates, for example, two kinds of digital baseband signals (hereafter, referred to as a digital I signal and a digital Q signal). Here, a configuration is possible in which the function of the transmitter 31 in FIG. 2 is included in the transmission processing circuit 113, the function of the receiver 32 is included in the reception processing circuit 114 and the functions of the access controller 33 and the controller 34 are included in the control circuit 112.

The communication processing device of the present embodiment corresponds, for example, to the control circuit 112, and may further include at least one the transmission processing circuit 113 or the reception processing circuit 114. The communication processing device of the present embodiment includes both a one-IC chip mode and a multi-IC chip mode.

The DA conversion circuits 115 and 116 correspond to parts that perform DA conversion of each transmission and reception processor illustrated in FIG. 2 illustrated in FIG. 1. The DA conversion circuits 115 and 116 subject a frame processed by the transmission processing circuit 113 to the DA conversion. More specifically, the DA converting circuit 115 converts a digital I signal into an analog I signal, the DA converting circuit 116 converts a digital Q signal into an analog Q signal. Note that the analog signals may be transmitted with a single-line (single-system) signal as is without the quadrature modulation. In this case, the number of DA converting circuits may be one. In addition, in the case where signals to transmit are in single-line or multiple lines, the signals are transmitted after being distributed to a plurality of antennas, DA converting circuits may be provided corresponding to the number of antennas.

The RF unit 121 is, as one example, an RF analog IC or a high frequency IC or both of them. A transmission circuit 122 in the RF unit 121 corresponds to a part that performs processing at the time of transmission at a post-DA conversion stage in each transmission and reception processor illustrated in FIG. 2. The transmission circuit 122 includes a transmission filter that extracts a signal of a desired band from signals of the frames subjected to DA conversion by the DA conversion circuits 115 and 116, a mixer that performs up-conversion of the filtered signal into a radio frequency by the use of a signal of a constant frequency supplied from an oscillator, and a preamplifier (PA) that amplifies the signal after up-conversion, and so on.

A reception circuit 123 in the RF unit 121 corresponds to a part that performs processing at the time of reception up to the stage before AD conversion in each transmission and reception processor illustrated in FIG. 2. The reception circuit 123 includes an LNA (low-noise amplifier) that amplifies a signal received by an antenna, a mixer that down-converts the amplified signal into a baseband by the use of a signal of a constant frequency supplied from an oscillator, and a reception filter that extracts a signal of a desired band from the down-converted signal, and so on. More specifically, the reception circuit 123 subjects the received signals that is subjected to low-noise amplification by a low noise amplifier (not shown) to quadrature demodulation with carriers the phase difference between which is 90° to create the I (In-phase) signal being in phase with the received signal and the Q (Quad-phase) signal with a phase delayed by 90° from the I signal. These I signal and Q signal are adjusted in gain and output from the reception circuit 123.

The control circuit 112 may control the operations of the transmission filter of the transmission circuit 122 and of the reception filter of the reception circuit 123 such that, according to the setting of a used channel, a signal of a channel covered by the channel set is extracted. Similar control may be performed by the control circuit 112 giving instructions to another controlling unit which controls the transmission circuit 122 and the reception circuit 123.

The AD conversion circuits 117 and 118 in the baseband unit 111 correspond to a part that performs DA conversion in each transmission and reception processor illustrated in FIG. 2. The AD conversion circuits 117 and 118 perform AD conversion on an input signal from the reception circuit 123. More specifically, the AD converting circuit 117 converts an I signal into a digital I signal, and the AD converting circuit 118 converts the Q signal into a digital Q signal. Note that the analog signals may be received with a single-line signal without the quadrature modulation. In this case, the number of the AD converting circuits may be one. In addition, in the case where a plurality of antennas are provided, AD converting circuits corresponding in number to the antennas may be provided. Here, in a case where a terminal performs MIMO communication, the control circuit 112 also performs processing related to MIMO, for example, channel estimation, transmission weight calculation and stream separation.

Here, a switch that switches the antennas 1 to N between any one of the transmission circuit 122 and the reception circuit 123 may be disposed in the RF unit. By controlling the switch, at the time of transmission, the antennas 1 to N may be connected to the transmission circuit 122 and, at the time of reception, the antennas 1 to N may be connected to the reception circuit 123.

In FIG. 15, although the DA conversion circuits 115 and 116 and the AD conversion circuits 117 and 118 are disposed with/at the baseband unit 111, they may be configured to be disposed with/at the RF unit 121.

Here, a wireless communicator may be formed with the transmission circuit 122 and the reception circuit 123. The wireless communicator may be formed to include DA conversion circuit 115, DA conversion circuit 116, DA conversion circuit 117 and DA conversion circuit 118 in addition to the transmission circuit 122 and the reception circuit 123. Also, in addition to this, the wireless communicator may be formed to include the respective PHY processing part of the transmission processing circuit 113 and the reception processing circuit 114. Alternatively, the wireless communicator may be formed with the respective PHY reception processing unit of the transmission processing circuit 113 and the reception processing circuit 114.

Figure 16:
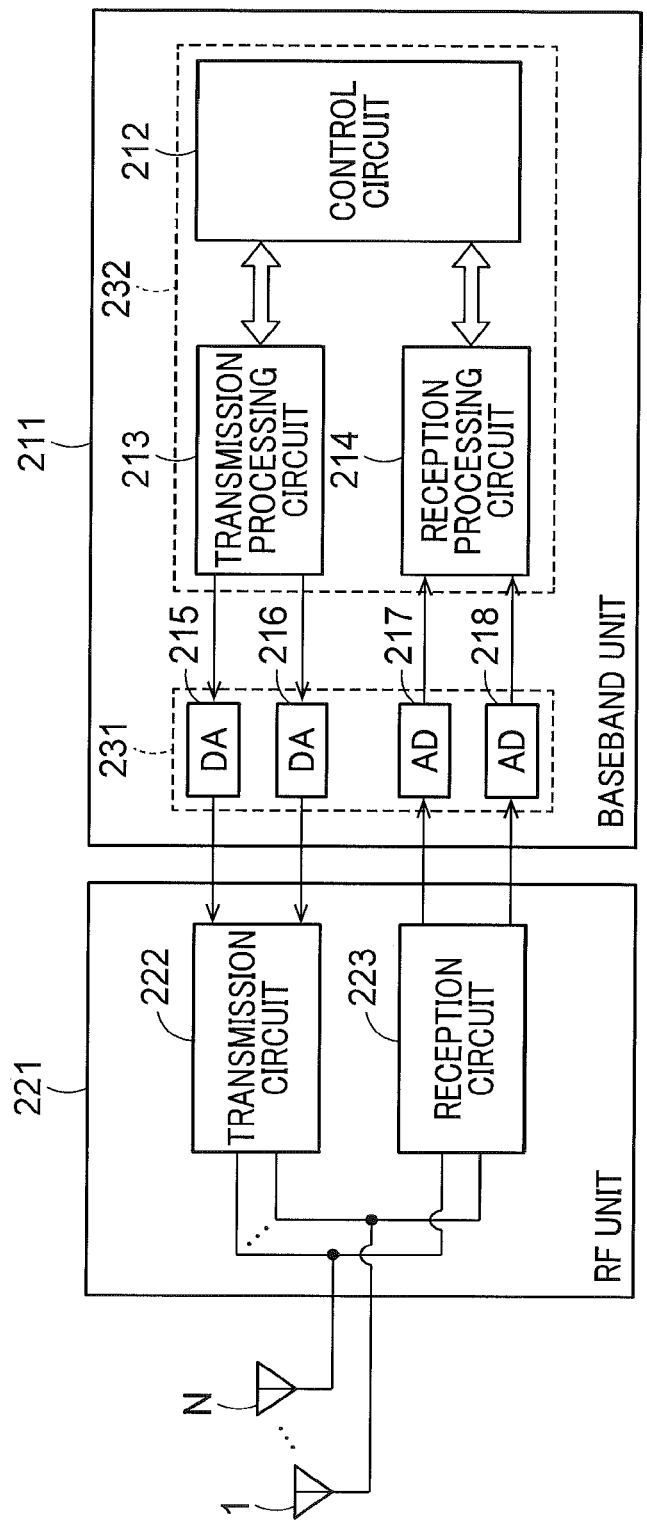
FIG. 16 is a diagram showing an exemplary hardware configuration of the wireless communication device mounted on the base station according to the first embodiment.

FIG. 16 illustrates a hardware configuration example of a wireless communication device provided in a base station according to the present embodiment. This hardware configuration is one example, various changes being applicable to the hardware configuration. Since the operation of the wireless communication device illustrated in FIG. 16 is similar to the wireless communication device of the base station described above in FIG. 3, the description below is centered on the differences in hardware configuration and detailed operation explanations have been omitted.

This wireless communication device includes a baseband unit 211, an RF unit 221 and antennas 1 to N.

The baseband unit 211 includes a control circuit 212, a transmission processing circuit 213, a reception processing circuit 214, DA conversion circuits 215 and 216 and AD conversion circuits 217 and 218. The RF unit 221 and the baseband unit 211 may be collectively configured as IC (Integrated Circuit) chip or may be configured as individual chips As one example, the baseband unit 211 is a baseband LSI or a baseband IC or both of them. Alternatively, as shown by a dotted line frame in the figure, the baseband unit 211 may include an IC 232 and an IC 231. At this time, the circuits may be divided between each IC such that the IC 232 includes the control circuit 212, the transmission processing circuit 213 and the reception processing circuit 214, while the IC 231 includes the DA conversion circuits 215 and 216 and the AD conversion circuits 217 and 218.

The control circuit 212 corresponds, as one example, to a communication controlling device for controlling communication, or a controller (or controlling circuitry) for controlling communication. At least one of the transmission processing circuit 213 or the reception processing circuit 214 may be included in the communication controlling device or the controller (or controlling circuitry). At this point, the wireless communicator may include the transmission processing circuit 213 and the reception processing circuit 214. The wireless communicator may further include the DA conversion circuits 215 and 216, and the AD conversion circuits 217 and 218, in addition to the transmission processing circuit 213 and the reception processing circuit 214. The wireless communicator may even further include a transmission circuit 122 and a reception circuit 223, in addition to the transmission processing circuit 213, the reception processing circuit 214, the DA conversion circuits 215 and 216, and the AD conversion circuits 217 and 218. The integrated circuit according to the present embodiment may include a processor that performs all or a part of the process of the baseband unit 211, that is, all or a part of the processes of the control circuit 212, the transmission processing circuit 213, the reception processing circuit 214, the DA conversion circuits 215 and 216, and the AD conversion circuits 217 and 218.

Alternatively, the IC 232 may correspond to the communication controlling device for controlling communication. At this point, the wireless communicator may include the transmission circuit 222 and the reception circuit 223. The wireless communicator may further include the DA conversion circuits 215 and 216, and the AD conversion circuits 217 and 218, in addition to the transmission circuit 222 and the reception circuit 223.

The control circuit 212 chiefly executes the functions of the access controller 83, the controller 84, the transmitter 81 and the receiver 82. The function of the upper layer processor 90 may be included in the control circuit 212. The control circuit 212 may include a clock generator. The transmission processing circuit 213 corresponds to a component that performs PHY layer processing on each transmission and reception processor in the PHY processing and wireless unit 70 illustrated in FIG. 3. That is, the transmission processing circuit 213 performs processing such as adding of preamble and PHY header, coding and modulation. The transmission processing circuit 213 performs processing such as adding of preamble and PHY header, coding and modulation, and and creates, for example, two kinds of digital baseband signals (hereafter, referred to as a digital I signal and a digital Q signal). Here, in a case of MIMO transmission, two kinds of digital baseband signals are created for each stream.

The communication processing device of the present embodiment corresponds, for example, to the control circuit 212, and may further include at least one the transmission processing circuit 213 or the reception processing circuit 214. The communication processing device of the present embodiment includes both a one-IC chip mode and a multi-IC chip mode.

The DA conversion circuits 215 and 216 correspond to parts that perform DA conversion of each transmission and reception processor illustrated in FIG. 3 illustrated in FIG. 1. The DA conversion circuits 215 and 216 subject a frame processed by the transmission processing circuit 213 to the DA conversion. More specifically, the DA converting circuit 215 converts the digital I signal into an analog I signal, the DA converting circuit 216 converts the digital Q signal into an analog Q signal. Note that the analog signals may be transmitted with a single-line (single-system) signal as is without the quadrature modulation. In this case, the number of DA converting circuits may be one. In addition, in the case where signals to transmit are in single-line or multiple lines, the signals are transmitted after being distributed to a plurality of antennas, DA converting circuits may be provided corresponding to the number of antennas.

The RF unit 221 is, as one example, an RF analog IC or a high frequency IC or both of them. A transmission circuit 222 in the RF unit 221 corresponds to a part that performs processing at the time of transmission at a post-DA conversion stage in each transmission and reception processor illustrated in FIG. 3. The transmission circuit 222 includes a transmission filter that extracts a signal of a desired band from signals of the frames subjected to DA conversion by the DA conversion circuits 215 and 216, a mixer that performs up-conversion of the filtered signal into a radio frequency by the use of a signal of a constant frequency supplied from an oscillator, and a preamplifier (PA) that amplifies the signal after up-conversion, and so on.

A reception circuit 223 in the RF unit 221 corresponds to a part that performs processing at the time of reception up to the stage before AD conversion in each transmission and reception processor illustrated in FIG. 3. The reception circuit 223 includes an LNA (low-noise amplifier) that amplifies a signal received by an antenna, a mixer that down-converts the amplified signal into a baseband by the use of a signal of a constant frequency supplied from an oscillator, and a reception filter that extracts a signal of a desired band from the down-converted signal, and so on. More specifically, the reception circuit 223 subjects the received signals that is subjected to low-noise amplification by a low noise amplifier (not shown) to quadrature demodulation with carriers the phase difference between which is 90° to create the I (In-phase) signal being in phase with the received signal and the Q (Quad-phase) signal with a phase delayed by 90° from the I signal. These I signal and Q signal are adjusted in gain and output from the reception circuit 223.

The control circuit 212 may control the operations of the transmission filter of the transmission circuit 122 and of the reception filter of the reception circuit 223 such that, according to the setting of a used channel, a signal of a channel covered by the channel set is extracted. Similar control may be performed by the control circuit 212 giving instructions to another controlling unit which controls the transmission circuit 122 and the reception circuit 223.

The AD conversion circuits 217 and 218 in the baseband unit 211 correspond to a part that performs DA conversion in each transmission and reception processor illustrated in FIG. 3. The AD conversion circuits 217 and 218 perform AD conversion on an input signal from the reception circuit 223. More specifically, the AD converting circuit 217 converts an I signal into a digital I signal, and the AD converting circuit 218 converts the Q signal into a digital Q signal. Note that the analog signals may be received with a single-line signal without the quadrature modulation. In this case, the number of the AD converting circuits may be one. In addition, in the case where a plurality of antennas are provided, AD converting circuits corresponding in number to the antennas may be provided. Here, in a case where a terminal performs MIMO communication, the control circuit 212 also performs processing related to MIMO, for example, channel estimation, transmission weight calculation and stream separation.

Here, a switch that switches the antennas 1 to N between any one of the transmission circuit 222 and the reception circuit 223 may be disposed in the RF unit. By controlling the switch, at the time of transmission, the antennas 1 to N may be connected to the transmission circuit 122 and, at the time of reception, the antennas 1 to N may be connected to the reception circuit 223.

In FIG. 16, although the DA conversion circuits 215 and 216 and the AD conversion circuits 217 and 218 are disposed with/at the baseband unit 211, they may be configured to be disposed with/at the RF unit 221.

Here, a wireless communicator may be formed with the transmission circuit 222 and the reception circuit 223. The wireless communicator may be formed to include DA conversion circuit 215, DA conversion circuit 216, DA conversion circuit 217 and DA conversion circuit 218 in addition to the transmission circuit 222 and the reception circuit 223. Also, in addition to this, the wireless communicator may be formed to include the respective PHY processing part of the transmission processing circuit 213 and the reception processing circuit 214. Alternatively, the wireless communicator may be formed with the respective PHY reception processing unit of the transmission processing circuit 213 and the reception processing circuit 214.

(Eleventh Embodiment)

Figure 17:
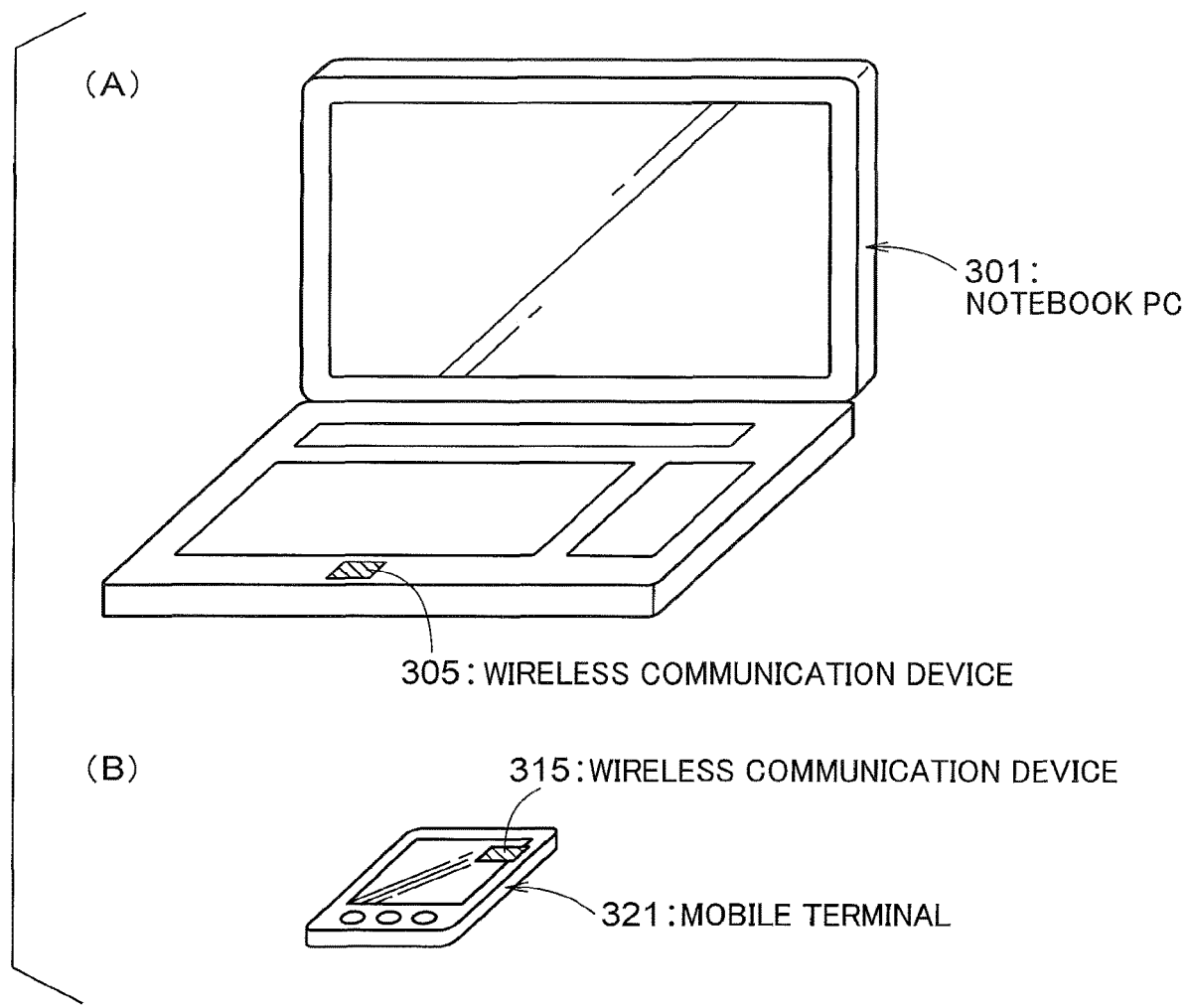
FIG. 17 is a perspective view of a wireless device according to the embodiment.

FIG. 17(A) and FIG. 17(B) are perspective views of wireless terminal according to the seventh embodiment. The wireless terminal in FIG. 17(A) is a notebook PC 301 and the wireless communication device in FIG. 17(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 18:
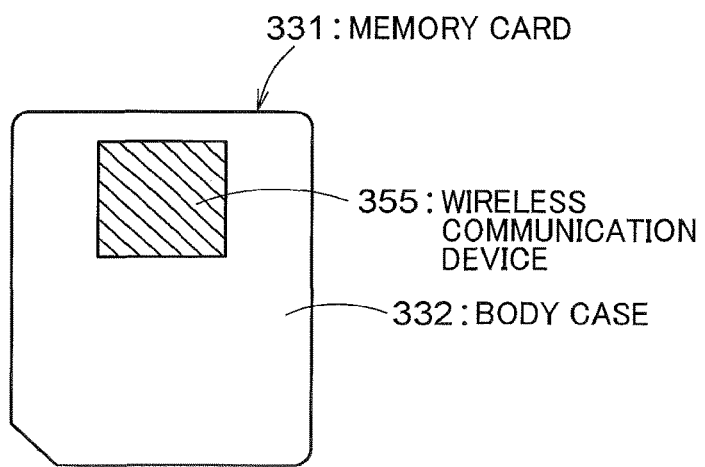
FIG. 18 is a diagram showing a memory card according to the embodiment.

Moreover, a wireless communication device installed in a terminal (which may indicate a base station) can also be provided in a memory card. FIG. 18 illustrates an example of a wireless communication device mounted on a memory card. A memory card 331 contains a wireless communication device 355 and a body case 332. The memory card 331 uses the wireless communication device 355 for wireless communication with external devices. Here, in FIG. 18, the description of other installed elements (for example, a memory, and so on) in the memory card 331 is omitted.

(Twelfth Embodiment)

In the twelfth embodiment, a bus, a processor unit and an external interface unit are provided in addition to the configuration of the wireless communication device according to any of the first to eleventh embodiments. The processor unit and the external interface unit are connected with an external memory (a buffer) through the bus. A firmware operates in the processor. Thus, by adopting a configuration in which the firmware is included in the wireless communication device, the functions of the wireless communication device can be easily changed by rewriting the firmware. The processor in which the firmware operates may be a processor that performs the processing of the communication controlling device, the controller, the access controller or a plurality of processing thereof, or alternatively may be another processor that performs a process relating to extending or altering the functions of the process of the above processing. The processor in which the firmware operates may be included in the access point or the wireless terminal or both of them according to the present embodiment. Alternatively, the processor may be included in the integrated circuit of the wireless communication device installed in the access point, or in the integrated circuit of the wireless communication device installed in the wireless terminal.

(Thirteenth Embodiment)

In the thirteenth embodiment, a clock generator is provided in addition to the configuration of the wireless communication device according to any of the first to eleventh embodiments. The clock generator generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

(Fourteenth Embodiment)

In the fourteenth embodiment, a power source, a power source controller and a wireless power feeder are included in addition to the configuration of the wireless communication device according to any of the first to eleventh embodiments. The power supply controller is connected to the power source and to the wireless power feeder, and performs control to select a power source to be supplied to the wireless communication device. Thus, by adopting a configuration in which the power source is included in the wireless communication device, power consumption reduction operations that control the power source are possible.

(Fifteenth Embodiment)

In the fifteenth embodiment, a SIM card is added to the configuration of the wireless communication device according to the fourteenth embodiment. For example, the SIM card is connected with the MAC processor or the controller in the wireless communication device. Thus, by adopting a configuration in which the SIM card is included in the wireless communication device, authentication processing can be easily performed.

(Sixteenth Embodiment)

In the sixteenth embodiment, a video image compressing/decompressing unit is added to the configuration of the wireless communication device according to the eleventh embodiment. The video image compressing/decompressing unit is connected to the bus. Thus, by adopting a configuration in which the video image compressing/decompressing unit is included in the wireless communication device, transmitting a compressed video image and decompressing a received compressed video image can be easily done.

(Seventeenth Embodiment)

In the seventeenth embodiment, an LED unit is added to the configuration of the wireless communication device according to any of the first to eleventh embodiments. For example, the LED unit is connected to at least one of the MAC processor, the transmission processing circuit, the reception processing circuit or the controller. Thus, by adopting a configuration in which the LED unit is included in the wireless communication device, notifying the operation state of the wireless communication device to the user can be easily done.

(Eighteenth Embodiment)

In the eighteenth embodiment, a vibrator unit is included in addition to the configuration of the wireless communication device according to any of the first to eleventh embodiments. For example, the vibrator unit is connected to at least one of the MAC processor, the transmission processing circuit, the reception processing circuit or the controller. Thus, by adopting a configuration in which the vibrator unit is included in the wireless communication device, notifying the operation state of the wireless communication device to the user can be easily done.

(Nineteenth Embodiment)

In a nineteenth embodiment, the configuration of the wireless communication device includes a display in addition to the configuration of the wireless communication device (the wireless communication device of the terminal (which may indicate the base station) according to any one of the first to eleventh embodiments. The display may be connected to the MAC processor of the wireless communication device via a bus (not shown). As seen from the above, the configuration including the display to display the operation state of the wireless communication device on the display allows the operation status of the wireless communication device to be easily notified to a user.

(Twentieth Embodiment)

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame.

These three types of frames are subjected to processing based on the necessity in the physical layer and then transmitted as physical packets via an antenna. Here, in a procedure of connection establishment, a connection request frame and a connection reception frame denote the management frame, and it is possible to use the response frame of the control frame as a confirmation frame with respect to the connection reception frame.

[2] Technique of Disconnection Between Wireless Communication Devices

For disconnection, there are an explicit technique and an implicit technique. As the explicit technique, a frame to disconnect any one of the connected wireless communication devices is transmitted. This frame is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. This is because, at the time of transmitting the frame for disconnection, a physical wireless link may not be secured, for example, the communication distance to the wireless communication device of connection destination is separated and radio signals cannot be received or decoded.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of the IEEE802.11 wireless LAN is described. There are six types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where the right of priority according to the traffic type is not distinguished, AIFS is used in a case where the right of priority by traffic identifier (TID) is provided.

Since operation is similar between DIFS and AIFS, AIFS is chiefly used to give an explanation below. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails.

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 19:
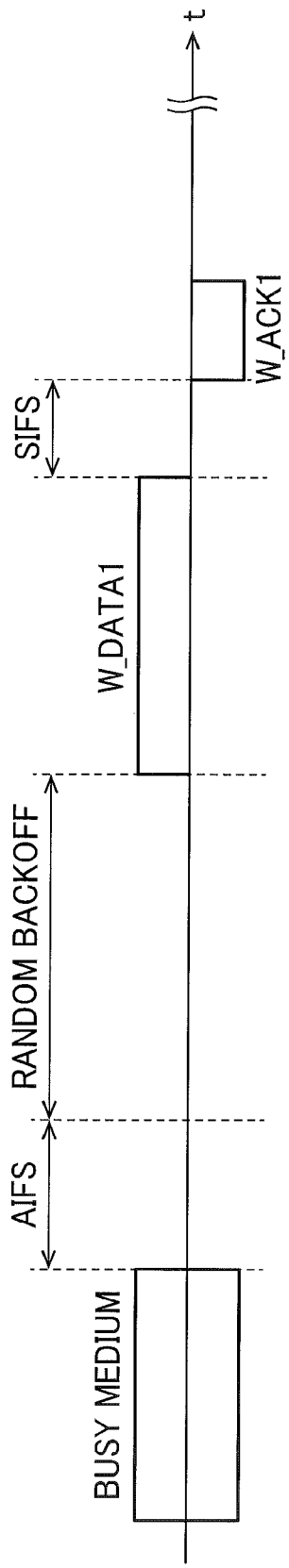
FIG. 19 is a diagram showing an example of frame exchange during a contention period.

Here, FIG. 19 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters to which the value of each access category such as AIGS, CWmin and CWmax is set can be set every communication group (which is a basic service set (BSS) in the IEEE802.11 wireless LAN), the default values are defined.

For example, in the definition of 802.11ac, with an assumption that SIFS is 16 µs and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device comprising:
a receiver configured to receive from each of a plurality of other wireless communication devices first information specifying at least one communication resource requested to be allocated;
a transmitter configured to transmit second information specifying at least one communication resource allocated to each of the other wireless communication devices based on the first information; and
controlling circuitry configured to allocate two or more consecutive communication resources to the communication device,
wherein the transmitter is configured to transmit signals via the communication resources specified in the second information,
the receiver is configured to receive signals via the communication resources specified in the second information, and
the second information includes
at least one set of: a smallest communication resource number or a largest communication resource number of consecutive communication resources being requested to be allocated; and communication resource width information specifying a number or bandwidth of the consecutive communication resources, or
at least one set of a smallest communication resource number and a largest communication resource number of consecutive communication resources being requested to be allocated.

2. A wireless communication device comprising:
a receiver configured to receive from each of a plurality of other wireless communication devices first information specifying at least one communication resource requested to be allocated; and
a transmitter configured to transmit second information specifying at least one communication resource allocated to each of the other wireless communication devices based on the first information,
wherein the transmitter is configured to transmit signals via the communication resources specified in the second information,
the receiver is configured to receive signals via the communication resources specified in the second information,
the first information includes a reason code field to identify a reason for which the communication resource is selected,
the reason code includes at least
a code indicating that the communication resource is selected because other communication resources are unavailable, or
a code indicating that the communication resource is selected but other communication resources are also available, and
the wireless communication device comprising controlling circuitry configured to allocate the communication resource based on the reason code included in the first information.

3. A wireless communication device comprising:
a receiver configured to receive from each of a plurality of other wireless communication devices first information specifying at least one communication resource requested to be allocated; and
a transmitter configured to transmit second information specifying at least one communication resource allocated to each of the other wireless communication devices based on the first information,
wherein the transmitter is configured to transmit signals via the communication resources specified in the second information,
the receiver is configured to receive signals via the communication resources specified in the second information, each of the plurality of communication resources belong to any one of a plurality of channels, the transmitter is configured to transmit third information representing to have a capability of handling a communication scheme in which transmission and reception are performed via the plurality of channels at independent timings among the channels, and the receiver is configured to receive the first information from the other wireless communication devices at independent timings, respectively.

4. The wireless communication device according to claim 1, further comprising at least one antenna.

5. A wireless communication method comprising:

receiving from each of a plurality of other wireless communication devices first information specifying at least one communication resource requested to be allocated;

transmitting second information specifying at least one communication resource allocated to each of the other wireless communication devices based on the first information;

transmitting signals via the communication resources specified in the second information;

receiving signals via the communication resources specified in the second information; and allocating two or more consecutive communication resources to the communication device wherein the second information includes at least one set of: a smallest communication resource number or largest communication resource number of consecutive communication resources being requested to be allocated; and communication resource width information specifying a number or bandwidth of the consecutive communication resources, or at least one set of a smallest communication resource number and a largest communication resource number of consecutive communication resources being requested to be allocated.

6. A wireless communication method comprising:

receiving from each of a plurality of other wireless communication devices first information specifying at least one communication resource requested to be allocated;

transmitting second information specifying at least one communication resource allocated to each of the other wireless communication devices based on the first information;

transmitting signals via the communication resources specified in the second information; and receiving signals via the communication resources specified in the second information, wherein the first information includes a reason code field to identify a reason for which the communication resource is selected, the reason code includes at least a code indicating that the communication resource is selected because other communication resources are unavailable, or a code indicating that the communication resource is selected but other communication resources are also available, and the wireless communication method comprising allocating the communication resource based on the reason code included in the first information.

7. A wireless communication method comprising:

receiving from each of a plurality of other wireless communication devices first information specifying at least one communication resource requested to be allocated;

transmitting second information specifying at least one communication resource allocated to each of the other wireless communication devices based on the first information;

transmitting signals via the communication resources specified in the second information; and receiving signals via the communication resources specified in the second information, wherein each of the plurality of communication resources belong to any one of a plurality of channels, the wireless communication method comprising:

transmitting third information representing to have a capability of handling a communication scheme in which transmission and reception are performed via the plurality of channels at independent timings among the channels, and receiving the first information from the other wireless communication devices at independent timings, respectively.

* * * * *